United States Patent [19]

Gotteschlich et al.

[11] 3,962,209

[45] June 8, 1976

[54] PROCESS FOR PREPARING AZO DYESTUFFS WITH ORTHO-AZO CYANO GROUPS BY CYANO EXCHANGE OF METAL CYANIDES AND HALO DYESTUFFS

[75] Inventors: Alois Gotteschlich; Klaus Leverenz, Leverkusen, both of Germany

[73] Assignee: Bayer Aktiengesellschaft, Leverkusen, Germany

[22] Filed: May 18, 1973

[21] Appl. No.: 361,603

Related U.S. Application Data

[63] Continuation of Ser. No. 28,247, April 17, 1970, abandoned, which is a continuation of Ser. No. 615,898, Feb. 14, 1967, abandoned.

[30] Foreign Application Priority Data

Feb. 17, 1966 Germany.............................. 48454
Jan. 12, 1967 Germany.............................. 51232

[52] U.S. Cl.............................. 260/152; 260/144; 260/155; 260/156; 260/165; 260/192; 260/196; 260/205; 260/206; 260/207; 260/207.1; 260/207.5; 260/208
[51] Int. Cl.² ..................... C09B 43/00; D06P 1/18; D06P 3/26; D06P 3/54
[58] Field of Search ........... 260/208, 205, 206, 207, 260/207.5, 207.1, 106; 266/192, 196, 152, 155, 158, 165

[56] References Cited
UNITED STATES PATENTS

| | | | |
|---|---|---|---|
| 1,725,596 | 8/1929 | Pongratz | 260/465 R |
| 2,128,684 | 8/1939 | Vollmann et al. | 260/465 R |
| 2,195,076 | 3/1940 | Braun et al. | 260/465 R |
| 3,259,646 | 7/1966 | Harris et al. | 260/465 F |

FOREIGN PATENTS OR APPLICATIONS

627,138   3/1936   Germany .......................... 260/174

OTHER PUBLICATIONS

Bacon et al., J. Chem. Soc. (London), vol. of 1964, pp. 1097 to 1107.

*Primary Examiner*—Floyd D. Higel
*Attorney, Agent, or Firm*—Plumley and Tyner

[57] ABSTRACT

Azo dyestuffs having the formula

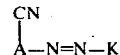

in which A is an aromatic carbocyclic radical containing the CN substituent in the o-position to the azo group and K is the radical of a coupling component as well as the process for their production are disclosed. The process involves cyano exchange between a metal cyanide, e.g. CuCN and the corresponding dyestuff containing Cl or Br instead of CN, in an organic solvent particularly polar aprotic organic solvents, e.g. dimethyl sulfoxide. The dyestuffs are suitable for dyeing a variety of fiber materials such as cotton, wool, silk as well as snythetic materials such as polyamide and polyethylene terphthalate to give dyeings which are characterized by great clearness and good general fastness properties.

9 Claims, No Drawings

PROCESS FOR PREPARING AZO DYESTUFFS WITH ORTHO-AZO CYANO GROUPS BY CYANO EXCHANGE OF METAL CYANIDES AND HALO DYESTUFFS

This is a continuation of application Ser. No. 28,247, filed Apr. 17, 1970 and now abandoned, which is a continuation of Ser. No. 615,898 filed Feb. 14, 1967, and now abandoned.

The present invention relates to a new process for the production of azo dyestuffs, including novel dyestuffs, which contain cyano groups and correspond to the formula

                                                (I)

In this formula, A denotes an aromatic-carbocyclic radical in which the CN-substituent is in the o-position to the azo group, and K is the radical of a coupling component, preferably a N-substituted para-aminoarylene radical.

The radicals A and K can otherwise contain further substituents customary in azo dyestuffs, such as halogen, alkyl, aralkyl, aryl, alkoxy, nitro, cyano, trifluoroalkyl, sulphone, acylamino, acyl groups, primary, secondary and tertiary amino groups, hydroxyl, carboxylic acid, sulphonic acid, carboxylic acid ester or optionally substituted carboxylic acid amide groups or sulphonic acid amide groups and other groupings.

A class of preferred and novel dyestuffs within the scope of the products of the formula (I) corresponds to the formula

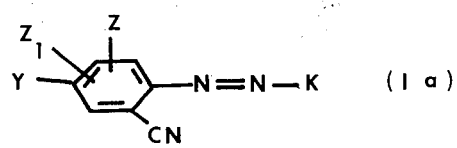
                                          (I a)

In this formula, Y denotes hydrogen or a group —$NO_2$,

—CN, —$R_1$, $OR_1$, —$CF_3$, —$SO_3R_1$,

—F, —Cl, —Br or —$COR_4$ in which $R_1$ stands for an optionally substituted alkyl, aralkyl, or aryl radical, $R_2$ and $R_3$ stand for hydrogen or for identical or different substituents which may together also form part of a heterocyclic ring, $R_4$ is hydrogen, —OH, the radical —$R_1$, —$OR_1$ or

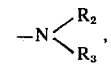

$R_9$ stands for an acyl group, preferably a formyl group or an optionally substituted alkylcarbonyl-, arylcarbonyl-, arylalkylcarbonyl-, alkylsulphonyl-, arylsulphonyl-, aminocarbonyl-, alkoxycarbonyl-, aralkoxycarbonyl- or aryloxycarbonyl group and $R_{10}$ denotes hydrogen, an optionally substituted alkyl-, cycloalkyl-, aralkyl- or aryl group or the group $R_9$; $R_9$ and $R_{10}$ may together form also part of a heterocyclic ring, and Z and $Z_1$ are hydrogen or substituents, preferably the groups —$NO_2$, —CN, —$R_1$, —$OR_1$, —$CF_3$, —$SO_2R_1$,

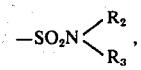

—Cl, —Br and —$COR_4$; K has the meaning above.
Suitable radicals

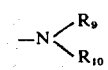

are for example the following:

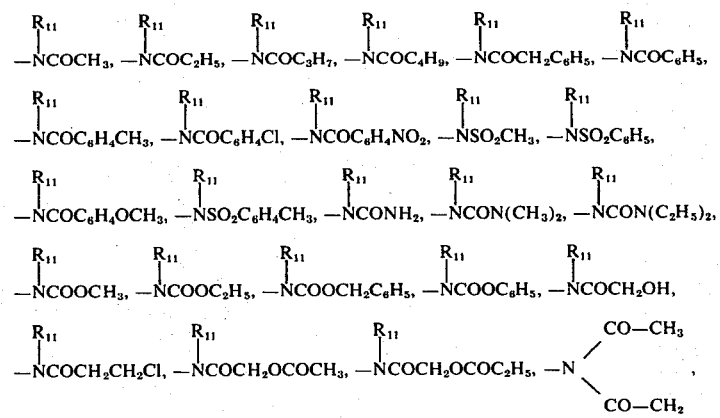

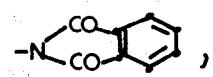

wherein $R_{11}$ stands for hydrogen, or an optionally substituted alkyl group, preferably a group with 1–4 C-atoms.

The process according to the invention consists in that dyestuffs of the general formula.

and in particular dyestuffs of the general formula

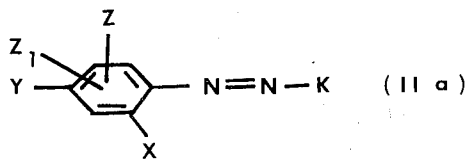

in which X stands for a halogen substituent, preferably Cl or Br, which stands in the radical A in the o-position to the azo group, and Y, Z, $Z_1$, A and K have the same meaning as above, are reacted with metal cyanides, preferably, copper(I) cyanide or compounds forming copper(I) cyanide, in an organic medium with the exchange of the halogen substituent X for the cyano substituent.

In the case where the starting dyestuffs of the formula (II) contain a second halogen substituent, preferably in the o-position to the azo group, or where the radical Z in starting dyestuffs of the formula (IIa) represents a halogen substituent, preferably cl or Br and preferably in the ortho-position to the azo group, also this halogen substituent can be exchanged for a cyano group, depending upon the reaction conditions and reaction components, with the formation of dicyanoaryl-azo dyestuffs, for example, 2,6-dicyanoaryl-1-azo dyestuffs.

The starting dyestuffs of the formula (II) or (IIa) can be used for the reaction in the form of a paste or, preferably, in the dry state. Suitable organic reaction media are, in particular, polar aprotic organic solvents, such as dimethyl sulphoxide, formamide, dimethyl formamide, dimethyl acetamide, N-methyl-pyrrolidone, pyridine, quinoline, acetonitrile, benzonitrile and phosphoric acid-tris-dimethylamide. Small amounts of water do not interfere with the reaction.

Suitable metal cyanides are, inter alia copper(I) cyanide, silver cyanide, lead cyanide, potassium hexacyanoferrate(II), calcium hexacyanoferrate(II), copper hexacyanoferrate(II) and sino cyanide. Among those copper(I) cyanide is of special interest because of its outstanding reactivity. It can be used as such or it can also be formed in the reaction medium, for example, by the addition of alkali metal cyanides and suitable copper(II) salts, such as copper(II) sulphate or copper(II) acetate, to the reaction mixture.

The reaction temperature may vary within a wide range. It depends on the nature of the organic medium and, in particular, on the constitution of the starting dyestuff (II). In general, the temperature is between about 20° and 220°C., temperatures between 25° and 150°C. being preferred.

The reaction can be carried out in such a manner that the starting dyestuffs (II) or (IIa) are dissolved or suspended in the organic medium with the metal cyanide, preferably copper(I) cyanide, or with the compounds forming copper(I) cyanide, and, if necessary, heated to an elevated temperature. The progress of the reaction can be controlled by paper or thin layer chromatography. After completion of the reaction, the reaction products can be precipitated, for example, with water. Any excess metal cyanide, such as copper(I) cyanide or copper(I) halide, can be separated from the reaction products obtained by conversion into water-soluble complex salts according to known methods, for example, with the aid of ammonia or alkali metal cyanide, or by oxidation of copper(I) salts to water-soluble copper(II) salts, for example, with iron(III) chloride.

If a second halogen substituent is present in the starting dyestuffs (II) in the ortho-position to the azo group of the radical $\alpha$, or if Z is a halogen substituent in the o-position to the azo group in compounds (IIa), then it is also possible, according to the process of the invention, to introduce two ortho-positioned cyano substituents into the radical of the diazo component of the dyestuffs; this leads to dyestuffs of the formula

or

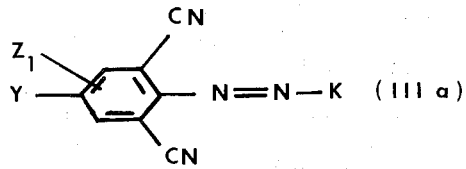

in which A, Y, $Z_1$ and K have the same meaning as above and the two cyano substituents in A stand in the o-position to the azo group.

It is particularly surprising that a second halogen atom in the ortho position of the diazo component can be easily exchanged. Hitherto 2,6-dicyano-aniline dyestuffs of the formula (III) have only been described in one Example of German Patent Specification No. 942,221.

If two ortho-positioned halogen substituents are present in the radical of the diazo component of the starting dyestuffs (II) or (IIa), it is possible to perform the exchange of both halogen atoms as well as the partial exchange of the halogen substituents for cyano. The partial exchange succeeds with particular ease in the case of dyestuffs of the formula (II) or (IIa) in which two substituents in the ortho-position to the azo group of the diazo component are chlorine substituents or one is a bromine and the other a chlorine substituent. In the last-mentioned case the bromine substituent is first exchanged for CN.

Suitable diazo components for the synthesis of the starting dyestuffs (II) or (IIa) are, inter alia: 2-bromo-1-amino-naphthalene, 2-chloro-1-amino-naphthalene, 1-bromo-2-amino-naphthalene, 1-chloro-2-amino-naphthalene, 2-bromo-1-amino-anthraquinone, 2,4-dibromo-1-amino-anthraquinone and, in particular, those of the benzene series, such as 2-chloro-aniline, 2-bromo-aniline, 2,3-dichloro-aniline, 2,4-dichloro-aniline, 2,4-dibromo-aniline, 2,5-dichloro-aniline, 2,6-dichloro-aniline, 2,4,5-trichloro-aniline, 2,4,6-trichloro-6-bromo-aniline, 2,4,6-trichloro-aniline, 2,4,6-tribromo-aniline, 2,4-dichloro-6-bromo-aniline, 2,6-dibromo-4-chloro-aniline, 2-amino-3-chloro-toluene, 2-amino-3-bromo-toluene, 3-chloro-4-amino-toluene, 3-bromo-4-amino-toluene, 4-chloro-3-amino-toluene, 4,6-dichloro-3-amino-toluene, 3,5-dichloro-4-amino-toluene, 3,5-dibromo-4-amino-toluene, 2,4-dimethyl-6-bromo-aniline, 2,4-dimethyl-6-chloro-aniline, 3,6-dichloro-4-amino-anisole, 3,5-dibromo-4-amino-anisole, 2-bromo-4,6-dimethoxy-aniline, 2-chloro-6-nitro-aniline, 2-bromo-6-nitro-aniline, 2-chloro-4-methyl-6-nitro-aniline, 2-bromo-4-methyl-6-nitro-aniline, 2-amino-3-bromo-5-methyl-1-methylsulphonyl-benzene, 2-chloro-4-nitro-aniline, 2-bromo-4-nitro-aniline, 2,6-dichloro-4-nitro-aniline, 2-bromo-6-chloro-4-nitro-aniline, 2,6-dibromo-4-nitro-aniline, 3,5-dibromo-4-amino-benzoic acid, 3,5-dibromo-4-amino-benzoic acid methyl ester, 3,5-dibromo-4-amino-1-cyanobenzene, 3,5-dichloro-4-amino-1-cyanobenzene, 3,5-dichloro-4-amino-1-methylsulphonyl-benzene, 3,5-dibromo-4-amino-1-methylsulphonyl-benzene, 3,5-dichloro-4-aminobenzene-sulphonamide, 3,5-dibromo-4-amino-benzene-sulphonamide, 3,5-dichloro-4-amino-acetophenone, 3,5-dibromo-4-amino-acetophenone, 3,5-dibromo-4-amino-benzophenone, 3,5-dibromo-4-amino-1-trifluoromethyl-benzene, 2-bromo-4-cyano-aniline, 2-amino-3-bromo-5-nitro-benzoic acid methyl ester, 2-amino-3-bromo-5-nitro-1-trifluoromethyl-benzene, 2-amino-3-bromo-5-nitro-1-methyl-sulphenyl-benzene, 2-bromo-4,6-bis-(methylsulphonyl)-aniline, 2-amino-3-bromo-5-nitro-anisole, 2-amino-3-bromo-5-nitro-toluene, 3-bromo-4-amino-5-nitro-benzaldehyde, 3-bromo-4-amino-5-nitro-1-cyanobenzene, 6-chloro-2,4-dinitro-aniline, 6-bromo-2,4-dinitro-aniline, 2-cyano-6-chloro-4-nitro-aniline, 2-cyano-6-bromo-4-nitro-aniline, 2-bromo-4,6-dicyano-aniline, 3,5-dichloro-4-amino-acetanilide, 3,5-dibromo-4-amino-acetanilide, 3,5-dichloro-4-amino-glycolic acid-anilide, 3,5-dibromo-4-amino-glycolic acid-anilide, 3,5-dichloro-4-amino-α-chloro-acetanilide, 3,5-dibromo-4-amino-α-chloro-acetanilide, 3,5-dichloro-4-amino-α-cyano-acetanilide, 3,5-dibromo-4-amino-α-cyano-acetanilide, 3,5-dichloro-4-amino-β-chloropropionic acid-anilide, 3,5-dibromo-4-amino-β-chloropropionic acid-anilide, 3,5-dibromo-4-amino-1-(N-ethyl-N-acetyl-amino)-benzene, 3,5-dibromo-4-amino-1-(N-cyclohexyl-N-acetyl-amino)-benzene, N-(3,5-dibromo-4-amino-phenyl)-carbamic acid-methylester, N-(3,5-dibromo-4-amino-phenyl)-carbamic acid-ethylester, (3,5-dibromo-4-amino-phenyl)-urea, N,N-dimethyl-N'-(3,5-dibromo-4-amino-phenyl)-urea, 3,5-dibromo-4-amino-1-(N-ethyl-N-methylsulfonyl-amino)-benzene, 3,5-dichloro-4-amino-1-(N-benzoyl-amino)-benzene, 3,5-dibromo-4-amino-1-(N-ethyl-N-benzoyl-amino)-benzene, 3,5-dibromo-4-amino-1-(N-4'-nitrobenzoylamino)-benzene, 3,5-dibromo-4-amino-1-(N-ethyl-N-benzenesulfonylamino)-benzene, N-(3,5-dibromo-4-amino-phenyl)-succinimide, N-(3,5-dibromo-4-amino-phenyl)-maleic acid-imide, N-(3,5-dibromo-4-amino-phenyl)-phthalic acid-imide.

Suitable coupling components for the synthesis of the starting dyestuffs (II) are, for example: aniline and its N-alkyl derivatives such as N-methyl-aniline, N-ethyl-aniline, N,N-dimethyl-aniline, N,N-diethyl-aniline, N-(β-hydroxyethyl)-aniline, N-methyl-N-(β-hydroxyethyl)-aniline, N-ethyl-N-(β-hydroxyethyl)-aniline, N-butyl-N-(β-hydroxyethyl)-aniline, N,N-bis-(β-hydroxyethyl)-aniline, N-(β-cyanoethyl)-aniline, N-methyl-N-(β-cyanoethyl)-aniline, N,N-bis-(β-cyanoethyl)-aniline, N-(β-hydroxyethyl)-W-(β-cyanoethyl)-aniline, N-(β-carbomethoxyethyl)-aniline, N-ethyl-N-(β-carboethoxy-ethyl)-aniline, N-(β-cyanoethyl)-N-(β-carbomethoxyethyl)-aniline, N,N-(β-carbomethoxyethyl)-aniline, N-ethyl-N-(β-acetoxyethyl)-aniline, N-(β-cyanoethyl)-N-(β-acetoxyethyl)-aniline, N,N-bis-(β-acetoxyethyl)-aniline, N-ethyl-N-(β-methoxyethyl)-aniline, N,N-bis-(2,3-dihydroxypropyl)-aniline, N-ethyl-N-(2-hydroxy-3-chloropropyl)-aniline, N-benzyl-N-(β-cyanoethyl)-aniline, and also 3-chloro-aniline, 3-methylaniline, 2,5-dimethyl-aniline, 3-methoxy-aniline, 3-ethoxy-aniline, 5-methyl-2-methoxy-aniline, 5-methyl-2-ethoxy-aniline, 2,5-dimethoxy-aniline, 3-acetylamino-aniline, 2-methoxy-5-acetylamino-aniline, 2-ethoxy-5-acetylamino-aniline and its N-substituted derivatives correspondng to the above aniline compounds. Furthermore diphenylamine, 1-amino-naphthalene and its N-substituted derivatives, such as 1-(N,N-dimethylamino)-naphthalene or 1-(N-β-hydroxyethylamino)-naphthalene, 1-amino-naphthalene-6-sulphonic acid, 1-amino-naphthalene-7-sulphonic acid, 1,2,3,4-tetrahydro-quinoline and its N-substituted derivatives, such as N-(β-hydroxyethyl)-1,2,3,4-tetrahydro-quinoline and N-(β-cyanoethyl)-1,2,3,4-tetrahydro-quinoline. Furthermore, hydroxy-benzene, 1-hydroxy-2-methyl-benzene, 1-hydroxy-3-methyl-benzene, 1-hydroxy-3-acetylamino-benzene, 1-hydroxy-3-methoxy-benzene, 1-hydroxy-2,5-dimethyl-benzene, 1-hydroxy-naphthalene, 1-hydroxy-naphthalene-6-sulphonic acid, 1-hydroxy-naphthalene-7-sulphonic acid, 8-hydroxy-quinoline, 2-methyl-indole, 2-phenyl-indole, 2-[N-methyl-N-(β-cyanoethyl)-amino]-4-phenyl-thiazole.

The reaction according to the invention is remarkable over a wide range because of its low reaction temperatures and short reaction times and in this respect it is surprising in comparison with the reactions of halogenated aromatic hydrocarbons with, for example, copper(I) cyanide known from the literature (J.Am.-Chem.Soc.81 [1959] 3667; J. Org. Chem. 26 [1953] 2524; J. Chem.Soc. [1964] 1097). Whereas the known reactions require temperatures between 110° and 210°C., the majority of the starting dyestuffs to be used according to the invention can be caused to react with metal cyanides, especially copper(I) cyanide and compounds forming copper(I) cyanide, already at temperatures below 100°C., in some cases even at room temperature, within a short time.

In addition, the process according to the invention offers the possibility of synthetising a great number of valuable 2-monocyano and 2,X-, such as 2,6-, dicyano-substituted benzene-azo-aryl dyestuffs which have hitherto been unknown or the production of which has been substantially simplified in that it is now possible to use the easily obtainable ortho-halo-aniline diazo components instead of having first to prepare ortho-cyano-aniline diazo components.

Preferred dyestuffs are those of the formula

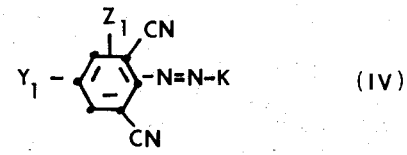 (IV)

in which K stands for the radical of a coupling component, $Y_1$ for a group $-NO_2$, $-CN$, $-CF_3$, $-R_1$, $-OR_1$, $-SO_2R_1$

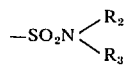

—F, —Br, —COR$_4$ or

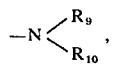

R$_1$ stands for an optionally substituted alkyl, aralkyl or aryl radical, R$_2$ and R$_3$ are hydrogen or identical or different substituents which together may also form part of a heterocyclic ring, R$_4$ is hydrogen, —OH, —R$_1$, —OR$_1$ or —NR$_2$R$_3$, R$_9$ stands for an acyl group and R$_{10}$ being hydrogen, an optionally substituted alkyl-, cycloalkyl-, aralkyl- or aryl group or the group R$_9$; R$_9$ and R$_{10}$ may together form also part of a heterocyclic ring, and Z$_1$ stands for hydrogen or a substituent, and azo dyestuffs free of sulphonic acid groups of the formula

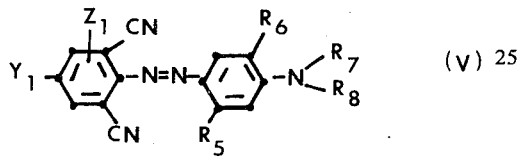

(V)

in which Y$_1$ and Z$_1$ have the above said meaning, R$_5$ stands for hydrogen, alkyl, alkoxy, halogen or an acylamino group, R$_6$ is hydrogen, alkyl or alkoxy, R$_7$ is hydrogen or an optionally substituted alkyl radical, and R$_8$ is an optionally substituted alkyl radical.

Even further preferred are the dyestuffs of formula IV wherein Y$_1$ is —NO$_2$.

The dyestuffs which may be obtained according to the above described process are eminently suitable for the dyeing of hydrophobic materials, especially fibre materials made of aromatic polyesters, such s polyethylene-terephthalates and polyesters obtained from terephthalic acid and 1,4-bis-hydroxymethyl-cyclohexane, cellulose triacetate, cellulose-2 ½-acetate, synthetic superpolyamides and -polyurethanes, polymers or copolymers of acrylonitrile, and polyolefines.

Dyeing with the dyestuffs of the present invention, and particularly novel dyestuffs of Formula IV and V, is carried out in such a manner that the material to be dyed is introduced into an aqueous solution or dispersion of the dyestuffs, preferably at an elevated temperature, for example, at 40°C., that conventional auxiliaries are added, such as sulphite cellulose decomposition products, condensation products of higher alcohols with ethylene oxide, polyglycol ethers of fatty acid amides or alkylphenols, sulphosuccinic acid esters of Turkey red oil, and the bath is preferably admixed with acidic agents, for example, with organic acids, such as formic acid or acetic acid, or with inorganic acids, such as phosphoric acid. The bath is then heated to the optimum dyeing temperature, preferably to a temperature between 70° and 140°C., depending upon the type of fibre materials to be dyed. Dyeing is carried out at this temperature, until the desired intensity of colour is achieved. When the bath has cooled, the dyed fibre material can be subjected to an after-treatment, for example, to an after-treatment with soaps in the case of acetate fibres, or to a reductive after-treatment with the addition of alkali in the case of fibres of aromatic polyesters.

If the dyestuffs contain no water-solubilizing carboxyl or ammonium groups, they are preferably used in dispersed form. Suitable dispersing agents are, for example, dinaphthyl-methane sulphonate or condensation products of cresol-2-naphthol-6-sulphonic acid and formaldehyde.

When dyeing aromatic polyesters or triacetate fibres, at temperatures up to 105°C., it is generally advantageous to add conventional carrier substances, such as mono-, di- or trichlorobenzene, benzoic acid, salicyclic acid, salicyclic acid methyl ester, cresotic acid methyl ester, o-, or p-phenyl-phenol, β-naphthyl ethyl ether or benzyl alcohol.

Printing is also carried out in known manner by applying to the materials a printing pasts which contains the dyestuff or dyestuffs and the usual auxiliaries, and subsequently subjecting the materials to a warm or hot treatment.

The dyestuffs of the formula (I) are suitable for dyeing and printing fibre fabrics, fibre yarns and endless yarns, combed material or loose material and mixed fabrics of fibres of the said type with natural fibres, such as cotton, wool and silk, or mixed fabrics of the hydrophobic fibres with one another. The dyeings are characterized by great clearness and good general fastness properties.

The present invention is further illustrated by the following examples in which all parts and percentages are by weight unless otherwise stated, and the temperatures are in degrees Centigrade.

EXAMPLE 1

14 Grams of the azo dyestuff 2-bromo-6-chloro-4-nitroaniline ⟶ 1-N,N-diethylamino-3-acetylaminobenzene are dissolved in 150 ml. N-methyl-pyrrolidone and 5 g. copper(I) cyanide are added. The solution changes to blue-violet after some time; after 90 minutes, the starting dyestuff can no longer be detected in a thin layer chromatogram. After a further 3 hours, the resultant crystalline precipitate is filtered off with suction and recrystallized fromm dimethyl formamide/water (6 : 1), m.p. 244°. The dyestuff has the formula

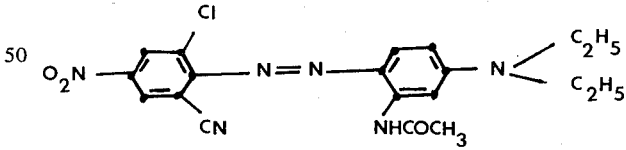

A CN-band can be clearly recognised in the infrared spectrum of the reaction product; determination of the molecular weight by mass spectroscopy yields the value 414 calculated for the above formula.

Analysis (C$_{19}$H$_{19}$ClN$_6$O$_3$)

Calc.: C, 55.0; H, 4.58; Cl; 8.57; N, 20.3; O 11.6.

Found: C, 55.56; H 4.81; Cl, 8,42; N, 20.19; O, 11.75.

According to melting point, mixed melting point and thin layer chromatogram the reaction product is identical with the azo dyestuff which is obtained by coupling diazotised 2-amino-3-chloro-5-nitro-1-cyanobenzene with 1-N,N-diethylamino-3-acetylamino-benzene.

EXAMPLE 2

7.7 Grams of the azo dyestuff 2,4-dinitro-6-bromoaniline → 1-N-(β-cyanoethyl)-N-(β-hydroxyethyl)-amino-2-methoxy-3-acetyl-amino-benzene are dissolved in 60 ml. dimethyl formamide and added at room temperature to a solution of 1.6 g. copper(I) cyanide in 20 ml. dimethyl formamide. The temperature rises slightly and the colour of the solution changes from navyblue to greenish blue. After stirring for 1 hour, the reaction product is precipitated with a little ice-water, filtered off with suction and stirred in a solution of 5 g. potassium cyanide in 60 ml. of water for 2 hours in order to remove the copper(I) salts. The resultant dyestuff of the formula

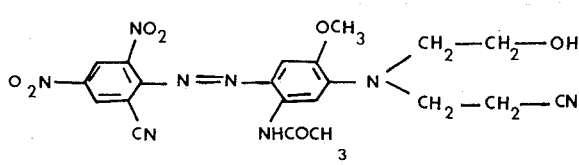

is filtered off with suction and washed several times with water. The Beilstein test for halogen is negative, the determination of the molecular weight by mass spectroscopy yields the value 550 calculated for the above formula.

EXAMPLE 3

6.8 Grams of the azo dyestuff 2,4-dinitro-6-bromoaniline → N-butyl-N-(β-cyanoethyl)-aniline are dissolved in 60 ml. dimethyl sulphoxide, 1.6 g. copper(I) cyanide are added and the mixture is heated at 70°. for 2 hours, while stirring. The colour of the solution changes to violet. After cooling, the reaction product is precipitated by the addition of icewater. The resultant dyestuff of the formula

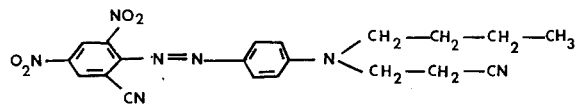

proves to be identical with the dyestuff prepared by diazotising 2-amino-3,5-dinitro-1-cyanobenzene and coupling with N-butyl-N-(β-cyanoethyl)-aniline.

EXAMPLE 4

6.17 Grams of the azo dyestuff which is obtained by diazotising 2-bromo-4,6-dicyano-aniline in concentrated sulphuric acid and coupling with 1-N,N-diethylamino-3-ethoxybenzene, are dissolved in 40 ml. N-methyl-pyrrolidone and combined with a solution of 1.6 g. copper(I) cyanide in 20 ml. N-methyl-pyrrolidone. The mixture is heated to 80°, while stirring. At this temperature the colour of the solution changes from red to violet. After 3 hours the starting dyestuff can no longer be detected in a thin layer chromatogram. The reaction product is precipitated by the addition of ice-water, filtered off with suction and thoroughly stirred with 50 ml. of a 10% aqueous ammonia solution in order to remove the copper(I) salts. After another suctionfiltration and washing with water, halogen can no longer be detected. The dried dyestuff dissolves in dimethyl formamide with a violet colour. It corresponds to the formula

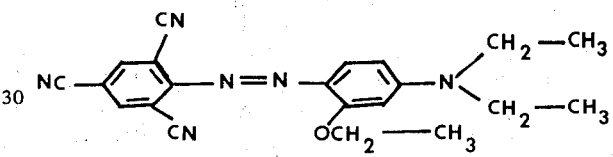

Determination of the molecular weight by mass spectroscopy yields the value 375 palculated for the above formula.

If the halogen-containing azo dyestuffs listed in the column "starting material" of the following Table are reacted with copper(I) cyanide in the stated solvent at the stated temperature, then there are obtained the cyano groupcontaining azo dyestuffs which are listed in the column "reaction product"; the colour of their solution in dimethyl formamide can be seen from the last column.

| No. | Starting material | Reaction product | Solvent | Temperature | Colour of solution in dimethyl formamide |
|---|---|---|---|---|---|
| 1 | 2-bromo-4,6-dinitro-aniline → N-(β-cyanoethyl)-N-(β-hydroxyetyl)-aniline | | N-methyl-pyrrolidone | 70° | violet |
| 2 | 2-bromo-4,6-dinitro-aniline → N-(β-cyanoethyl)-N-(β-hydroxyethyl)-m-toluidine | | dimethyl formamide | 90° | blue-violet |

-continued

| No. | Starting material | Reaction product | Solvent | Temperature | Colour of solution in dimethyl formamide |
|---|---|---|---|---|---|
| 3 | 2-bromo-4,6-dinitro-aniline → N,N-bis-(β-hydroxyethyl)-m-toluidine | [structure: 2,4-dinitro-6-cyano-phenyl-N=N-phenyl(CH3)-N(CH2CH2OH)2] | dimethyl acetamide | 90° | blue |
| 4 | 2-bromo-4-nitroaniline → N-(β-cyanoethyl)-N-(β-hydroxyethyl)-aniline | [structure: 4-nitro-2-cyano-phenyl-N=N-phenyl-N(CH2CH2OH)(CH2CH2CN)] | N-methyl-pyrrolidone | 150° | bluish red |
| 5 | 2,4-dichloro-aniline → N-butyl-N-β-hydroxyethyl-aniline | [structure: 4-chloro-2-cyano-phenyl-N=N-phenyl-N(CH2CH2CH2CH3)(CH2CH2OH)] | N-methyl-pyrrolidone | 200° | yellowish red |
| 6 | 2-bromo-6-chloro-4-nitroaniline → N-ethyl-N-(β-carbomethoxy-ethyl)-3-acetamino-aniline | [structure: 2-chloro-4-nitro-6-cyano-phenyl-N=N-phenyl(NHCOCH3)-N(CH2CH3)(CH2CH2COOCH3)] | N-methyl-pyrrolidone | 25° | violet |
| 7 | 2,6-dichloro-4-nitroaniline → N,N-diethyl-3-acetamino-aniline | [structure: 2-chloro-4-nitro-6-cyano-phenyl-N=N-phenyl(NHCOCH3)-N(CH2CH3)2] | N-methyl-pyrrolidone | 25° | violet |
| 8 | 2-bromo-6-chloro-4-nitroaniline → N-methyl-N(β-cyanoethyl)-aniline | [structure: 2-chloro-4-nitro-6-cyano-phenyl-N=N-phenyl-N(CH3)(CH2CH2CN)] | dimethyl sulphoxide | 25° | bordeaux |
| 9 | 2-bromo-4,6-dinitro-aniline → N,N-bis-(β-acetoxyethyl)-2-ethoxy-5-acetamino-aniline | [structure: 2,4-dinitro-6-cyano-phenyl-N=N-phenyl(OC2H5)(NHCOCH3)-N(CH2CH2OCOCH3)2] | formamide | 90° | greenish blue |
| 10 | (2-amino-3-bromo-5-nitro-phenyl)-methylsulphone → N,N-diethyl-3-ethoxy-aniline | [structure: 2-SO2CH3-4-nitro-6-cyano-phenyl-N=N-phenyl(O-CH2CH3)-N(CH2CH3)2] | dimethyl sulphoxide | 60° | blue |
| 11 | 3-bromo-5-nitro-2-amino-anisole → N,N-diethyl-3-ethoxy-aniline | [structure: 2-OCH3-4-nitro-6-cyano-phenyl-N=N-phenyl(O-CH2CH3)-N(CH2CH3)2] | dimethyl sulphoxide | 60° | violet |

-continued

| No. | Starting material | Reaction product | Solvent | Temperature | Colour of solution in dimethyl formamide |
|---|---|---|---|---|---|
| 12 | 2-bromo-4,6-dicyano-aniline → N,N-di-(β-hydroxyethyl)-2-methoxy-5-acetamino-aniline | | dimethyl sulphoxide | 25° | greenish blue |
| 13 | 2-bromo-4,6-dicyano-aniline → N-ethyl-N-(β-carbomethoxy-ethyl)-3-acetamino-aniline | | dimethyl sulphoxide | 50° | blue-violet |
| 14 | 2-bromo-4,6-dicyano-aniline → N-(β-cyano-ethyl)-N-(β-carbomethoxy-ethyl)-aniline | | dimethyl sulphoxide | 60° | red |
| 15 | 2-bromo-4,6-dicyano-aniline → N-ethyl-N-β-hydroxyethyl)-m-toluidine | | dimethyl sulphoxide | 100° | reddish blue |
| 16 | 2-chloro-aniline → N,N-diethyl-3-acetamino-aniline | | N-methyl-pyrrolidone | 150° | orange-red |
| 17 | 2-bromo-aniline → N,N-diethyl-3-acetamino-aniline | | N-methyl-pyrrolidone | 120° | orange-red |
| 18 | 2,5-dichloro-aniline → N,N-diethyl-3-acetamino-aniline | | N-methyl-pyrrolidone | 150° | orange-red |
| 19 | 3-bromo-4-amino-toluene → N,N-diethyl-3-acetamino-aniline | | N-methyl-pyrrolidone | 110° | orange-red |
| 20 | 2,4-dimethyl-6-bromo-aniline → N,N-diethyl-3-acetamino-aniline | | N-methyl-pyrrolidone | 50° | orange-red |
| 21 | 2-bromo-4,6-dimethoxy-aniline → N,N-diethyl-3-acetamino-aniline | | N-methyl-pyrrolidone | 50° | red |

-continued

| No. | Starting material | Reaction product | Solvent | Temperature | Colour of solution in dimethyl formamide |
|---|---|---|---|---|---|
| 22 | 3-chloro-2-amino-toluene → N,N-diethyl-3-acetamino-aniline | (structure with CH$_3$, CN, N=N, NHCOCH$_3$, N(CH$_2$CH$_3$)$_2$) | N-methyl-pyrrolidone | 120° | orange-red |
| 23 | 2,5-dibromo-aniline → N,N-diethyl-3-acetamino-aniline | (structure with CN, CN, N=N, NHCOCH$_3$, N(CH$_2$CH$_3$)$_2$) | N-methyl-pyrrolidone | 180° | Bordeaux |
| 24 | 2-bromo-4-nitro-6-cyano-aniline → N-ethyl-N-(β-carbomethoxyethyl)-3-acetamino-aniline | O$_2$N—(CN)(CN)—N=N—()—N(CH$_2$CH$_3$)(CH$_2$CH$_2$COOCH$_3$), NHCOCH$_3$ | dimethylformamide | 50° | blue |
| 25 | 2-chloro-4-nitro-6-cyano-aniline → N,N-bis(β-methoxycarbonyloxyethyl)-3-acetamino-aniline | O$_2$N—(CN)(CN)—N=N—()—N(CH$_2$CH$_2$OCOOCH$_3$)$_2$, NHCOCH$_3$ | dimethylformamide | 80° | blue |
| 26 | 6-chloro-4-nitro-aniline → N,N-diethyl-3-acetamino-aniline | O$_2$N—()(CN)—N=N—()—N(CH$_2$CH$_3$)$_2$, NHCOCH$_3$ | N-methyl-pyrrolidone | 120° | red-violet |
| 27 | 2,5-dichloro-4-nitro-aniline → N,N-diethyl-3-acetamino-aniline | O$_2$N—(Cl)(CN)—N=N—()—N(CH$_2$CH$_3$)$_2$, NHCOCH$_3$ | N-methyl-pyrrolidone | 110° | red-violet |
| 28 | 2,5-dichloro-4-nitro-aniline → N,N-diethyl-3-acetamino-aniline | O$_2$N—(NC)(CN)—N=N—()—N(CH$_2$CH$_3$)$_2$, NHCOCH$_3$ | N-methyl-pyrrolidone | 130° | blue-violet |
| 29 | 2,5-dichloro-4-amino-benzonitril → N,N-diethyl-3-acetamino-aniline | NC—(Cl)(CN)—N=N—()—N(CH$_2$CH$_3$)$_2$, NHCOCH$_3$ | N-methyl-pyrrolidone | 100° | ruby |
| 30 | 2,5-dichloro-4-amino-benzonitril → N-butyl-N-(β-acetoxyethyl)-aniline | NC—(NC)(CN)—N=N—()—N(CH$_2$CH$_2$CH$_2$CH$_3$)(CH$_2$CH$_2$OCOCH$_3$) | N-methyl-pyrrolidone | 140° | violet |

-continued

| No. | Starting material | Reaction product | Solvent | Temperature | Colour of solution in dimethyl formamide |
|---|---|---|---|---|---|
| 31 | 4-bromo-3-nitro-aniline → N,N-diethyl-3-acet-amino-aniline | (structure) | N-methyl pyrrolidone | 120° | red |
| 32 | 3-bromo-5-chloro-4-aminobenzotrifluoride → N,N-bis-(β-hydroxyethyl)-3-acetamino-aniline | (structure) | N-methyl-pyrrolidone | 30° | ruby |
| 33 | 2-bromo-4,6-dicyan-aniline → N,N-bis-(β-hydroxyethyl)-m-toluidine | (structure) | dimethylformamide | 90° | violet |
| 34 | 2-bromo-4,6-dicyano-aniline → N-ethyl-N-β cyanoethyl-aniline | (structure) | dimethyl formamide | 60° | bordeaux |
| 35 | 2-bromo-4,6-dicyano-aniline → N-ethyl-N-β-cyanoethyl-m-toluidine | (structure) | dimethyl formamide | 90° | ruby |
| 36 | 2-bromo-4,6-dicyano-aniline → 1-N-(β-hydroxyethyl)-amino-2-methyl-5-acetamino-benzene | (structure) | N-methyl-pyrrolidone | 80° | red-violet |
| 37 | 3-bromo-5-chloro-4-amino benzotrifluoride → N-ethyl-N-(β-hydroxyethyl)-m-toluidine | (structure) | N-methyl-pyrrolidone | 90° | bordeaux |
| 38 | 2,5-dichloro-4-acetamino-aniline → N,N-diethyl-3-acetamino-aniline | (structure) | N-methyl-pyrrolidone | 120° | red |
| 39 | 3,5-dichloro-4-amino-acetanilide → N,N-diethyl-3-acetamino-aniline | (structure) | dimethyl formamide | 40° | red |

EXAMPLE 5

6.5 Grams copper(I) cyanide are dissolved in 100 ml. N-methyl-pyrrolidone, 15 g. of the azo dyestuff 2,6-dibromo-4-nitroaniline ⟶ 1-N,N-diethylamino-3-ethoxy-benzene are introduced and the mixture is heated at 80° – 90°. for about 3 hours while stirring. After cooling overnight, the reaction product which is precipitated in the form of dark crystals with a green-golden surface gloss, is filtered off with suction and recrystallised from dimethyl formamide/water (6 : 1), m.p. 236° – 237°. The product dissolves in dimethyl formamide with a clear greenish blue colour and corresponds to the formula

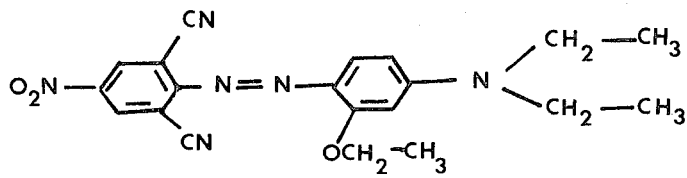

The product is free from halogen; the nitrile band is clearly recognisable in the infra-red spectrum, and determination of the molecular weight by mass spectroscopy yields the value 392 calculated for the above formula.

Analysis: ($C_{20}H_{20}N_6O_3$). Calc.: C, 61.21; H, 5.14; N, 21.42; O, 12.23. 1 Found: C, 60.80; H, 5.15; N, 21.03; O, 12.57.

EXAMPLE 6

A solution of 9.3 g. of the azo dyestuff, which is obtained by diazotising 2,6-dibromo-4-nitroaniline in concentrated sulphuric acid and coupling with N-methyl-N-($\beta$-cyanoethyl)-aniline, in 100 ml. N-methyl-pyrrolidone is added to a mixture of 6.6 g. potassium cyanide and 20 g. copper(II) acetate monohydrate in 100 ml. N-methyl-pyrrolidone, and the reaction mixture is heated at 70° – 80°. for 3 hours while stirring. Already after heating for 1 hour, the starting dyestuff can no longer be detected in a chromatogram, but two other dyestuffs have been formed instead, one Bordeaux-coloured and one violet, the Bordeaux-coloured dyestuff being identical with the azo dyestuff 2-amino-3-bromo-5-nitro-1-cyanobenzene ⟶ N-methyl-N-(p-cyanoethyl)-aniline.

After a further 3 hours, the Bordeaux-coloured component has disappeared and the colour of the solution has changed from the original red-brown to a clear violet. After cooling, the reaction product is precipitated by the addition of water, the precipitated copper(I) salts are dissolved by the addition of 10 g. potassium cyanide, and the dyestuff of the formula

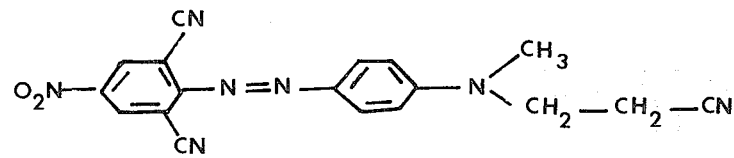

is filtered off. When dried, the dyestuff is a dark powder which dissolves in dimethyl formamide with a violet colour. The Bailstein test for halogen is negative.

EXAMPLE 7

7.7 Grams of the monoazo dyestuff obtained by diazotising 2,4,6-tribromo-aniline in concentrated sulphuric acid and coupling the diazo compound with 1-N,N-diethylamino-3-ethoxy-benzene are dissolved in 50 ml. N-methyl-pyrrolidone and, after the addition of a solution of 3.2 g. copper(I) cyanide in 30 ml. N-methyl-pyrrolidone, heated with stirring. The colour of the originally orange-yellow solution begins to change at 40°. to 50°. via red-brown to brown-red to give finally a clear Bordeaux at 90°. to 100°. After a reaction time of 90 minutes at 100°., the starting dyestuff can no longer be detected in a thin layer chromatogram, and also the brown dyestuff which initially occurs at 40°. to 50°. and is presumably formed by the exchange of only one bromine atom for the nitrile group, has disappeared. After working up as described in the preceding Examples, a dyestuff is obtained, which dissolves in dimethyl formamide with a clear Bordeaux colour and presumably corresponds to the formula

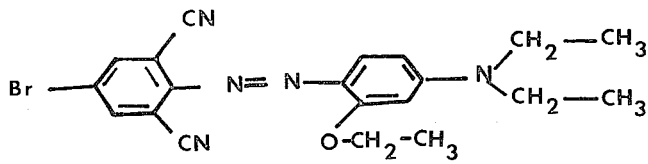

Determination of the molecular weight by mass spectroscopy yields the value 425 calculated for the above formula. The mass spectrum also proves that the compound is a monobromo compound.

EXAMPLE 8

7.45 Grams of the monoazo dyestuff obtained by diazotising 3,5-dibromo-4-amino-benzene-1-carboxylic acid methyl ester in concentrated sulphuric acid at 0°. and coupling with 1-N,N-bis-(P-hydroxyethyl)-amino-3-methyl-benzene are dissolved in 50 ml. N-methyl-pyrrolidone and, after the addition of 3.2 g. copper(I) cyanide, heated with stirring. The reaction sets in at 40°., as can be recognised by the fact that the originally orange-coloured solution turns red-brown. When heating is continued at 100°C., the reaction is completed after about 1 hour. The colour of the solution is clear violet, the thin layer chromatogram shows a homogeneous violet dyestuff. The brown dyestuff, which initially occurs at the low temperature and is formed by the exchange of only one bromine atom for the nitrile group, has disappeared. The resultant reaction product is isolated as described in Example 6 and freed from the copper(I) salts. In the dry state, the dyestuff so obtained is a dark powder and dissolves in dimethyl formamide with a violet colour. It very probably has the constitution

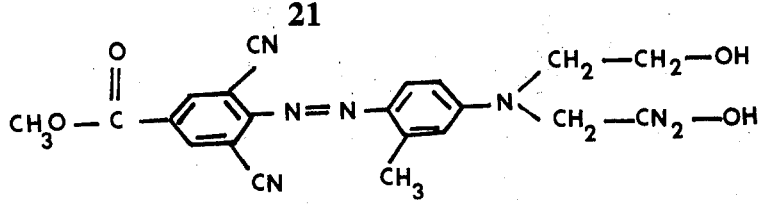

Further reactions of 2,6-dihalo-azo dyestuffs with copper(I) cyanide to give 2,6-dicyano products are compiled in the following Table.

| No. | Starting material | Reaction product | Solvent | Temperature | Colour of solution in dimethyl formamide |
|---|---|---|---|---|---|
| 1 | 2,6-dibromo-4-nitro-aniline → N,N-diethyl-3-acetamino-aniline | | dimethyl formamide | 40° | greenish blue |
| 2 | 2,6-dibromo-4-nitro-aniline → N-ethyl-N-(β-carbomethoxy-ethyl)-3-acetamino-aniline | | N-methyl pyrrolidone | 50° | blue |
| 3 | 2,6-dichloro-4-nitroaniline-N,N-diethyl-3-acetamino-aniline | | N-methyl pyrrolidone | 100° | greenish blue |
| 4 | 3,5-dichloro-4-amino-benzene-sulphonic acid-N,N-dimethylamide → N-ethyl-N-(β-hydroxyethyl)-m-toluidine | | N-methyl pyrrolidone | 150° | Bordeaux |
| 5 | 3,5-dibromo-4-amino-benzene-sulphonic acid-N,N-dimethylamide → N,N-diethyl-amino-3-ethoxy-benzene | | N-methyl pyrrolidone | 80° | Bordeaux |
| 6 | 2,6-dibromo-4-nitro-aniline → N-(β-trimethyl-ammonium ethyl)-1,2,3,4-tetrahydroquinoline chloride | | N-methyl pyrrolidone | 90° | blue violet |
| 7 | 2,6-dibromo-4-nitro-aniline → N-(β dimethylamino-ethyl)-1,2,3,4-tetrahydro-quinoline | | N-methyl pyrrolidone | 50° | reddish blue |
| 8 | 2,6-dibromo-4-nitro-aniline → N-(β-hydroxyethyl)-N-(β-cyanoethyl)-aniline | | N-methyl pyrrolidone | 50° | violet |

-continued

| No. | Starting material | Reaction product | Solvent | Temperature | Colour of solution in dimethyl formamide |
|---|---|---|---|---|---|
| 9 | 3,5-dibromo-4-amino-benzoic acid methyl ester → N,N-di-ethyl-amino-3-ethoxy-benzene | [structure: CH₃OOC-phenyl(CN,CN)-N=N-phenyl(O-CH₂-CH₃)-N(CH₂-CH₃)₂] | N-methyl pyrrolidone | 80° | violet |
| 10 | 2,6-dibromo-4-nitro-aniline → N-ethyl-N-(β-dimethylaminoethyl)-m-toluidine | [structure: O₂N-phenyl(CN,CN)-N=N-phenyl(CH₃)-N(CH₂-CH₃)(CH₂-CH₂-N(CH₃)₂)] | N-methyl pyrrolidone | 100° | blue-violet |
| 11 | 3,5-dibromo-4-amino-benzonitrile → N,N-bis-(β-hydroxyethyl)-2-ethoxy-5-acet-amino-aniline | [structure: NC-phenyl(CN,CN)-N=N-phenyl(O-CH₂-CH₃, NHCOCH₃)-N(CH₂-CH₂-OH)₂] | dimethyl sulphoxide | 25° | greenish blue |
| 12 | 2,6-dibromo-4-nitro-aniline → N-ethyl-N-(β-hydroxyethyl)-m-toluidine | [structure: O₂N-phenyl(CN,CN)-N=N-phenyl(CH₃)-N(CH₂-CH₃)(CH₂-CH₂-OH)] | phosphoric acid tris-dimethyl-amide | 100° | blue |
| 13 | 2,6-dibromo-4-nitro-aniline → N-(β-cyanoethyl)-N-(β-carbomethoxyethyl)-aniline | [structure: O₂N-phenyl(CN,CN)-N=N-phenyl-N(CH₂-CH₂-CN)(CH₂-CH₂-COOCH₃)] | dimethyl formamide | 50° | Bordeaux |
| 14 | 2,6-dibromo-4-nitro-aniline → N-ethyl-N-(β-hydroxyethyl)- | [structure: O₂N-phenyl(CN,CN)-N=N-phenyl-N(CH₂-CH₃)(CH₂-CH₂-OH)] | dimethyl formamide | 70° -aniline | blue |
| 15 | 2,6-dibromo-4-nitro-aniline → N,N-bis-(β-hydroxyethyl)-aniline | [structure: O₂N-phenyl(CN,CN)-N=N-phenyl-N(CH₂-CH₂-OH)₂] | dimethyl sulphoxide | 50° | blue |
| 16 | (3,5-dibromo-4-amino-phenyl)methyl-sulphone → N-ethyl-N-(β-hydroxyethyl)-aniline | [structure: CH₃-SO₂-phenyl(CN,CN)-N=N-phenyl-N(CH₂-CH₃)(CH₂-CH₂-OH)] | N-methyl pyrrolidone | 80° | ruby |
| 17 | (3,5-dibromo-4-aminophenyl)-methyl-sulphone → N-methyl-N-(β-cyanoethyl)- | [structure: CH₃-SO₂-phenyl(CN,CN)-N=N-phenyl-N(CH₃)(CH₂-CH₂-CN)] | N-methyl pyrrolidone | 80° | red |
| 18 | 3,5-dibromo-4-amino-benzonitrile → N-ethyl-N-(β-carbo-methoxyethyl)-3-acetaminoaniline | [structure: NC-phenyl(CN,CN)-N=N-phenyl(NHCOCH₃)-N(CH₂-CH₃)(CH₂-CH₂-COOCH₃)] | N-methyl pyrrolidone | 50° | blue-violet |

-continued

| No. | Starting material | Reaction product | Solvent | Temperature | Colour of solution in dimethyl formamide |
|---|---|---|---|---|---|
| 19 | 3,5-dibromo-4-amino-benzonitrile → N-(β-cyanoethyl)-N-(β-carbomethoxyethyl)-aniline | (structure with CN, CN, NC, N=N, CH₂-CH₂-CN, CH₂-CH₂-COOCH₃) | N-methyl pyrrolidone | 60° | red |
| 20 | 3,5-dibromo-4-amino-benzonitrile → N-ethyl-N-(β-hydroxyethyl)-m-toluidine | (structure with CN, CN, NC, N=N, CH₃, CH₂-CH₃, CH₂-CH₂OH) | N-methyl pyrrolidone | 100° | reddish blue |
| 21 | 3,5-dibromo-4-amino-benzoic acid → N,N-diethyl-3-ethoxy-aniline | (structure with HOOC, CN, CN, N=N, OCH₂CH₃, CH₂-CH₃, CH₂-CH₃) | N-methyl pyrrolidone | 100° | Bordeaux |
| 22 | 3,5-dibromo-4-amino-benzoic acid → N,N-di(β-hydroxyethyl)-aniline | (structure with HOOC, CN, CN, N=N, CH₂-CH₂-OH, CH₂-CH₂-OH) | N-methyl pyrrolidone | 100° | Bordeaux |
| 23 | 2,6-dibromo-aniline → N,N-diethyl-3-ethoxy-aniline | (structure with CN, CN, N=N, O-CH₂-CH₃, CH₂-CH₃, CH₂-CH₃) | N-methyl pyrrolidone | 100° | red |
| 24 | 3,5-dibromo-4-amino-toluene → N,N-diethyl-3-acetamino-aniline | (structure with CH₃, CN, CN, N=N, NHCOCH₃, CH₂-CH₃, CH₂-CH₃) | N-methyl pyrrolidone | 40° | red |
| 25 | 3,5-dibromo-4-amino-anisole → N,N-diethyl-3-acetamino-aniline | (structure with CH₃O, CN, CN, N=N, NHCOCH₃, CH₂-CH₃, CH₂-CH₃) | N-methyl pyrrolidone | 50° | red |
| 26 | 3,5-dibromo-4-amino-1-cyano-benzene → 2-phenyl-indole | (structure with NC, CN, CN, N=N, C₆H₅, indole N-H) | N-methyl pyrrolidone | 120° | red |
| 27 | 2,6-dibromoaniline → N-butyl-N-(β-hydroxyethyl)-m-toluidine | (structure with CN, CN, N=N, CH₃, CH₂CH₂CH₂CH₃, CH₂CH₂OH) | dimethyl formamide | 90° | red |
| 28 | 2,6-dibromoaniline → N-ethyl-N-(β-carbomethoxyethyl)-3-acet-amino-aniline | (structure with CN, CN, N=N, NHCOCH₃, CH₂CH₃, CH₂CH₂COOCH₃) | dimethyl formamide | 50° | pink |

-continued

| No. | Starting material | Reaction product | Solvent | Temperature | Colour of solution in dimethyl formamide |
|---|---|---|---|---|---|
| 29 | 2,6-dibromo-4-chloroaniline → N-butyl-N-(β-acetoxyethyl)-aniline | Cl—[Ar(CN,CN)]—N=N—[Ar]—N(CH$_2$CH$_2$CH$_2$CH$_3$)(CH$_2$CH$_2$OCCH$_3$∥O) | dimethyl formamide | 60° | red |
| 30 | 2,6-dibromo-4-chloroaniline → N-butyl-N-(β-hydroxyethyl)-m-toluidine | Cl—[Ar(CN,CN)]—N=N—[Ar(CH$_3$)]—N(CH$_2$CH$_2$CH$_2$CH$_3$)(CH$_2$CH$_2$OH) | dimethyl formamide | 90° | red |
| 31 | 2,6-dibromo-4-chloroaniline → N-ethyl-N-(β-carbomethoxyethyl)-3-acetamino-aniline | Cl—[Ar(CN,CN)]—N=N—[Ar(NHCOCH$_3$)]—N(CH$_2$CH$_3$)(CH$_2$CH$_2$COOCH$_3$) | dimethyl formamide | 30° | ruby |
| 32 | 2,4,6-tribromoanilin → N-butyl-N-(β-acetoxyethyl)-m-toluidine | Br—[Ar(CN,CN)]—N=N—[Ar(CH$_3$)]—N(CH$_2$CH$_2$CH$_2$CH$_3$)(CH$_2$CH$_2$OCCH$_3$∥O) | dimethyl formamide | 90° | red |
| 33 | 2,4,6-tribromoaniline → N-ethyl-N-(β-carbomethoxyethyl)-3-acetamino-aniline | Br—[Ar(CN,CN)]—N=N—[Ar(NHCOCH$_3$)]—N(CH$_2$CH$_3$)(CH$_2$CH$_2$COOCH$_3$) | dimethyl formamide | 30° | ruby |
| 34 | 3,5-dibromo-4-aminoanisol → N-butyl-N-(β-hydroxyethyl)m-toluidine | CH$_3$O—[Ar(CN,CN)]—N=N—[Ar(CH$_3$)]—N(CH$_2$CH$_2$CH$_2$CH$_3$)(CH$_2$CH$_2$OH) | dimethyl formamide | 90° | red |
| 35 | 3,5-dibromo-4-aminoacetophenone → N-ethyl-N-(β-hydroxyethyl)aniline | CH$_3$C(∥O)—[Ar(CN,CN)]—N=N—[Ar]—N(CH$_2$CH$_3$)(CH$_2$CH$_2$OH) | dimethyl formamide | 60° | ruby |
| 36 | 3,5-dibromo-4-aminoacetophenone → N-butyl-N-(β-hydroxyethyl)m-toluidine | CH$_3$C(∥O)—[Ar(CN,CN)]—N=N—[Ar(CH$_3$)]—N(CH$_2$CH$_2$CH$_2$CH$_3$)(CH$_2$CH$_2$OH) | dimethyl formamide | 90° | red-violet |
| 37 | 3,5-dibromo-4-aminoacetophenone → N-ethyl-N-(β-carbomethoxyethyl)-3-acetamino-aniline | CH$_3$C(∥O)—[Ar(CN,CN)]—N=N—[Ar(NHCOCH$_3$)]—N(CH$_2$CH$_3$)(CH$_2$CH$_2$COOCH$_3$) | dimethyl formamide | 30° | violet |
| 38 | 3,5-dibromo-4-aminobenzophenone → N-ethyl-N-(β-hydroxyethyl)-aniline | Ph—C(∥O)—[Ar(CN,CN)]—N=N—[Ar]—N(CH$_2$CH$_3$)(CH$_2$CH$_2$OH) | dimethyl formamide | 60° | ruby |

-continued

| No. | Starting material | Reaction product | Solvent | Temperature | Colour of solution in dimethyl formamide |
|---|---|---|---|---|---|
| 39 | 3,5-dibromo-4-amino-benzophenone → N-ethyl-N-(β-hydroxyethyl)-m-toluidine | | dimethyl formamide | 90° | red-violet |
| 40 | 3,5-dibromo-4-amino-benzophenone → N-ethyl-N-(β-carbomethoxyethyl)-3-acetamino-aniline | | dimethyl formamide | 50° | violet |
| 41 | 3,5-dibromo-4-amino-benzonitrile → N-butyl-N-(β-methoxycarbonyl-oxyethyl)-m-toluidin | | dimethyl formamide | 90° | red-violet |
| 42 | 3,5-dibromo-4-amino-benzonitrile → N,N-bis-(β-methoxycarbonyl-oxyethyl)-aniline | | dimethyl sulphoxide | 70° | red |
| 43 | 3-bromo-5-chloro-4-amino-benzotrifluoride → N,N-bis-(β-hydroxyethyl)-3-acetamino-aniline | | N-methyl-pyrrolidone | 100° | red-violet |
| 44 | 3,5-dibromo-4-amino-toluene → N-ethyl-N-(β-hydroxyethyl)-m-toluidine | | N-methyl pyrrolidone | 80° | red |
| 45 | 3,5-dibromo-4-amino-toluene → N-(β-hydroxyethyl)-3-acetamino-aniline | | dimethyl formamide | 50° | bluish red |
| 46 | 3,5-dibromo-4-amino-toluene → N,N-bis-(β-hydroxyethyl)-3-acetamino-aniline | | N-methyl-pyrrolidone | 40° | bluish red |
| 47 | 3,5-dibromo-4-amino-toluene → N-butyl-N-(β-hydroxy-ethyl)-aniline | | N-methyl-pyrrolidone | 70° | yellowish red |
| 48 | 3,5-dibromo-4-amino-toluol → N-ethyl-N-(β-carbomethoxyethyl)-m-acetamino-aniline | | N-methyl-pyrrolidone | 50° | ruby |
| 49 | 3,5-dibromo-4-amino-benzoic acidmethylester → N,N-bis-(β-methoxy-carbonyloxyethyl)-aniline | | N-methyl-pyrrolidone | 50° | bluish red |

| No. | Starting material | Reaction product | Solvent | Temperature | Colour of solution in dimethyl formamide |
|---|---|---|---|---|---|
| 50 | 3,5-dibromo-4-amino-benzoic acidmethylester → N-ethyl-N-(β-acetoxyethyl)-m-toluidine | CH₃OOC-⟨CN⟩-N=N-⟨⟩-N(CH₂CH₃)(CH₂CH₂OCOCH₃), CH₃ | N-methyl-pyrrolidone | 90° | violet |
| 51 | 3,5-dibromo-4-amino-benzoic acidmethylester → N-ethyl-N-(β-carbomethoxyethyl)-acetamino-aniline | CH₃OOC-⟨CN⟩-N=N-⟨NHCOCH₃⟩-N(CH₂CH₃)(CH₂CH₂COOCH₃) | N-methyl-pyrrolidone | 60° | violet |
| 52 | 3,5-dibromo-4-amino-toluene → N-(β-hydroxyethyl)-naphthylamin-(1) | CH₃-⟨CN⟩-N=N-⟨naphthyl⟩-NHCH₂CH₂OH | N-methyl-pyrrolidone | 70° | ruby |
| 53 | 3,5-dibromo-4-amino-acetanilide → N-butyl-N-(β-hydroxyethyl)-m-toluidine | CH₃CNH-⟨CN⟩-N=N-⟨CH₃⟩-N(CH₂CH₂CH₂CH₃)(CH₂CH₂OH) | dimethyl formamide | 90° | red |
| 54 | 3,5-dibromo-4-amino-acetanilide → N,N-diethyl-aniline | CH₃CNH-⟨CN⟩-N=N-⟨⟩-N(CH₂CH₃)(CH₂CH₃) | dimethyl formamide | 60° | red |
| 55 | 3,5-dibromo-4-amino-acetanilide → N-ethyl-N-(β-hydroxyethyl)-m-toluidine | CH₃CNH-⟨CN⟩-N=N-⟨CH₃⟩-N(CH₂CH₃)(CH₂CH₂OH) | dimethyl formamide | 90° | red |
| 56 | 3,5-dibromo-4-amino-acetanilide → N,N-diethyl-acetamino-aniline | CH₃CNH-⟨CN⟩-N=N-⟨NHCOCH₃⟩-N(CH₂CH₃)(CH₂CH₃) | dimethyl formamide | 40° | ruby |

EXAMPLE 9

23 Grams of the monoazo dyestuff 2,6-dibromo-4-nitraniline ⟶ N-ethyl-N-(β-carbomethoxyethyl)-3-acetaminoaniline, 8,6 g copper (I) cyanide and 7,8 ml. pyridine are heated for 2 hours while stirring in 100 ml nitrobenzene at a temperature of 90° – 100°C. The solvent is distilled off under vaccuum. The remaining residue is introduced at 0° – 5°C into a solution of 20 g sodium cyanide in 150 ml. water. After stirring for a short time, the precipitate is filtered off with suction, a dyestuff of the formula

is then obtained. The resulting dyestuff is a dark powder, which is soluble in dimethyl formamide with a blue colour.

EXAMPLE 10

0.1 Gram of the well dispersed dyestuff of the formula

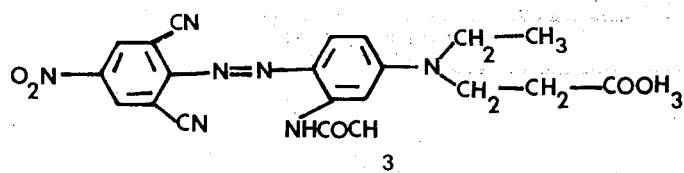

is introduced at 40° – 50°C. into 1 liter of water which also contains 0.1 – 0.2 g. of a sulphite cellulose decomposition product and 0.3 – 0.5 g. dichlorobenzene. 10 Grams of a fabric made of polyethylene terephthalate are introduced into this bath, the temperature of the dyebath is raised to 100°C. within about 20 minutes and dyeing is carried out at this temperature for about 60 to 90 minutes. A strongly reddish blue dyeing of good fastness to wet processing, sublimation and light is thus obtained.

If in the present Example the substrate is replaced with 10 g. of a fabric made of cellulose triacetate, then a clear reddish blue dyeing of good general fastness properties is obtained.

Under the dyeing conditions of the present Example the dyestuffs mentioned in the following Table yield the stated shades on polyester fibres:

Table

| Dyestuff | Shade on polyethylene terephthalate |
|---|---|
| | blue |
| | bluish violet |
| | Bordeaux |
| | " |
| | blue-violet |
| | blue |
| | red |

Table-continued
| Dyestuff | Shade on polyethylene terephthalate |
|---|---|
| 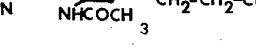 | greenish blue |
| 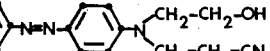 | violet |
|  | bluish violet |
|  | bluish violet |
| 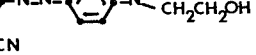 | bluish violet |
| 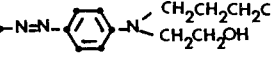 | bluish violet |
| 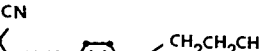 | violet |
|  | reddish violet |
| 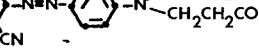 | reddish violet |
| 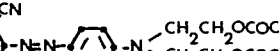 | bluish violet |

Table-continued
| Dyestuff | Shade on polyethylene terephthalate |
|---|---|
| 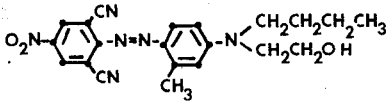 | bluish violet |
| 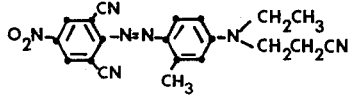 | bluish violet |
| 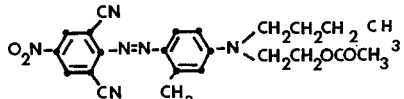 | bluish violet |
| 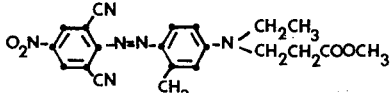 | bluish violet |
| 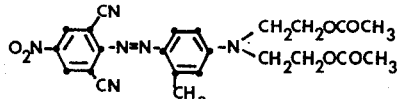 | bluish violet |
| 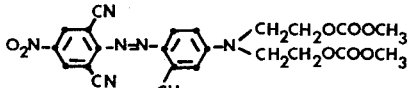 | bluish violet |
| 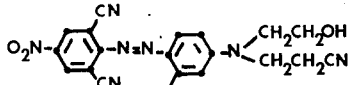 | violet |
| 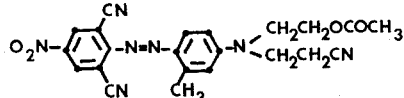 | reddish violet |
| 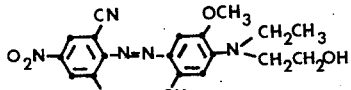 | reddish blue |
| 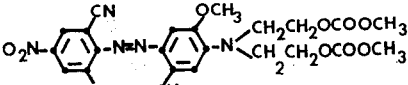 | reddish blue |

Table-continued
| Dyestuff | Shade on polyethylene terephthalate |
|---|---|
| 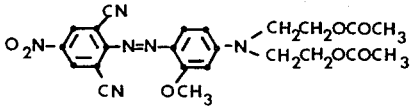 | violet |
| 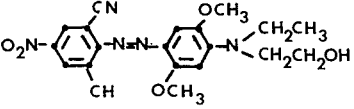 | blue |
| 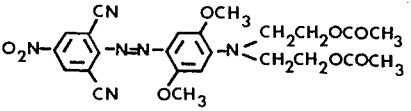 | reddish blue |
| 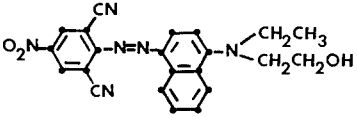 | greenish blue |
| 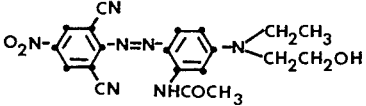 | blue |
| 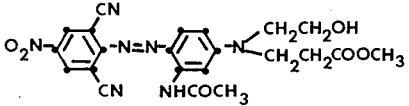 | blue |
| 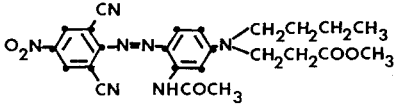 | blue |
| 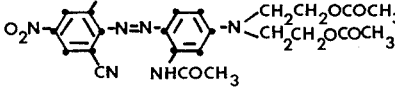 | reddish blue |
| 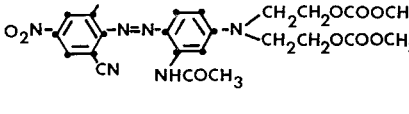 | reddish blue |
| 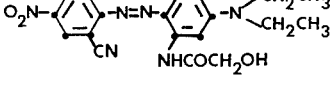 | blue |

Table-continued

| Dyestuff | Shade on polyethylene terephthalate |
|---|---|
| $O_2N$–⟨⟩(CN)(CN)–N=N–⟨⟩(NHCOCH$_2$OCOCH$_3$)–N(CH$_2$CH$_3$)(CH$_2$CH$_3$) | blue |
| $O_2N$–⟨⟩(CN)(CN)–N=N–⟨⟩(NHCOCH$_2$Cl)–N(CH$_3$)(CH$_3$) | blue |
| $O_2N$–⟨⟩(CN)(CN)–N=N–⟨⟩(NHCOCH$_2$CH$_2$Cl)–N(CH$_2$CH$_3$)(CH$_2$CH$_3$) | blue |
| $O_2N$–⟨⟩(CN)(CN)–N=N–⟨⟩(NHCOOCH$_3$)–N(CH$_2$CH$_3$)(CH$_2$CH$_3$) | blue |
| $O_2N$–⟨⟩(CN)(CN)–N=N–⟨⟩(NHCOCH$_3$)–N(CH$_2$CH$_3$)(CH$_2$CH$_2$OCH$_2$CH$_2$OH) | blue |
| $CH_3SO_2$–⟨⟩(CN)(CN)–N=N–⟨⟩–N(CH$_2$CH$_3$)(CH$_2$CH$_3$) | red-violet |
| $CH_3SO_2$–⟨⟩(CN)(CN)–N=N–⟨⟩–N(CH$_2$CH$_2$CH$_2$CH$_3$)(CH$_2$CH$_2$OH) | red-violet |
| $CH_3SO_2$–⟨⟩(CN)(CN)–N=N–⟨⟩–N(CH$_2$CH$_3$)(CH$_2$CH$_2$OCOCH$_3$) | red-violet |
| $CH_3SO_2$–⟨⟩(CN)(CN)–N=N–⟨⟩(CH$_3$)–N(CH$_2$CH$_3$)(CH$_2$CH$_2$Cl) | reddish-violet |
| $CH_3SO_2$–⟨⟩(CN)(CN)–N=N–⟨⟩(CH$_3$)–N(CH$_2$CH$_3$)(CH$_2$CH$_2$OH) | violet |

Table-continued
| Dyestuff | Shade on polyethylene terephthalate |
|---|---|
| 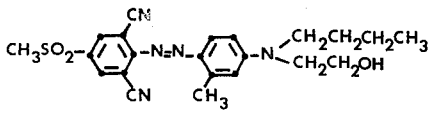 | violet |
| 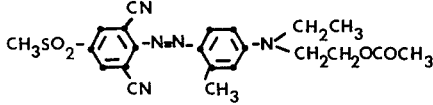 | reddish-violet |
| 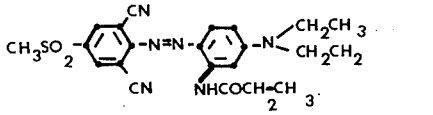 | violet |
| 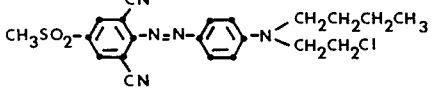 | red-violet |
| 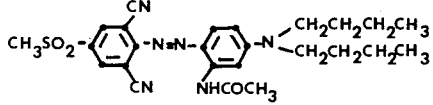 | violet |
| 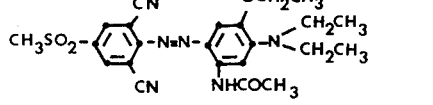 | blue |
| 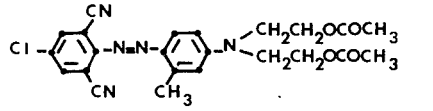 | red |
| 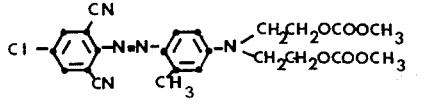 | red |
| 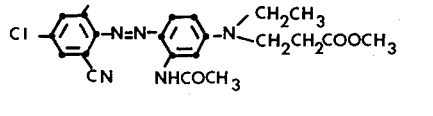 | ruby |

Table-continued
| Dyestuff | Shade on polyethylene terephthalate |
|---|---|
| 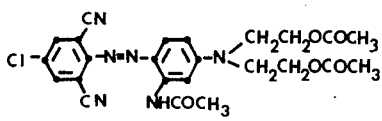 | ruby |
| 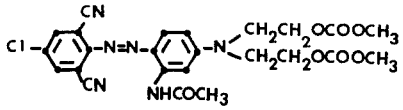 | ruby |
| 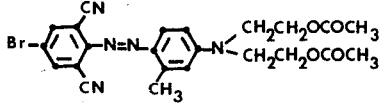 | red |
| 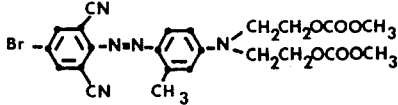 | red |
| 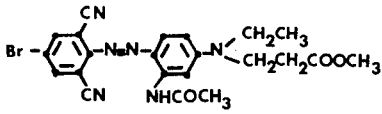 | ruby |
| 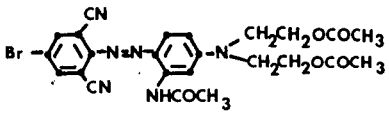 | ruby |
| 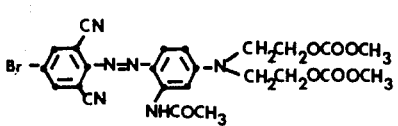 | ruby |
| 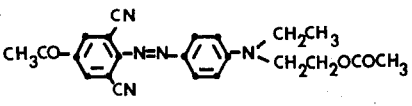 | ruby |
| 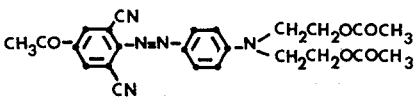 | bordeaux |

Table-continued
| Dyestuff | Shade on polyethylene terephthalate |
|---|---|
| 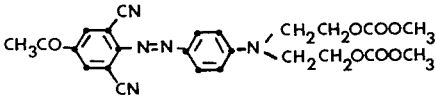 | bordeaux |
| 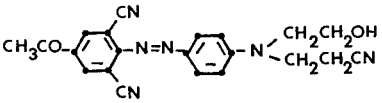 | bordeaux |
| 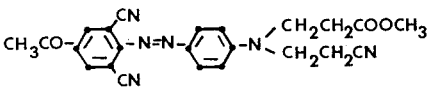 | bordeaux |
| 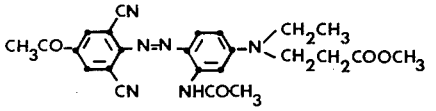 | violet |
| 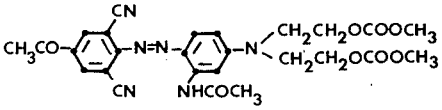 | red-violet |
| 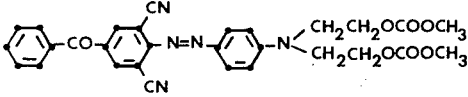 | bordeaux |
| 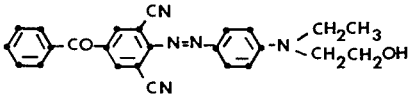 | ruby |
| 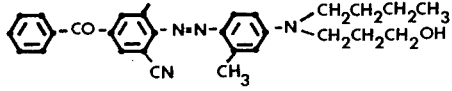 | red-violet |
| 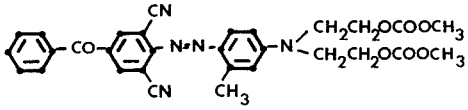 | ruby |
| 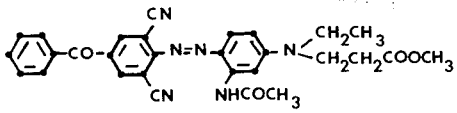 | violet |

Table-continued
| Dyestuff | Shade on polyethylene terephthalate |
|---|---|
| 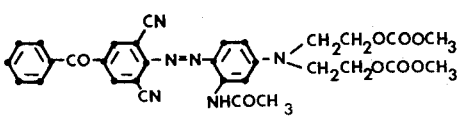 | violet |
| 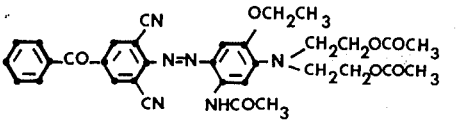 | blue |
| 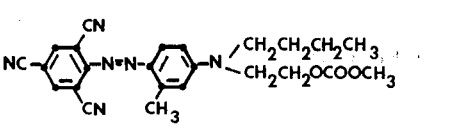 | red-violet |
| 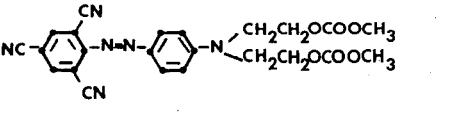 | red |
| 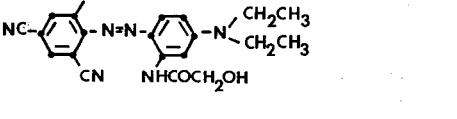 | violet |
| 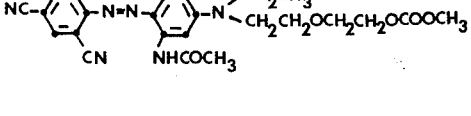 | violet |
| 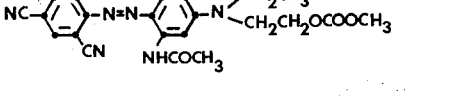 | violet |
| 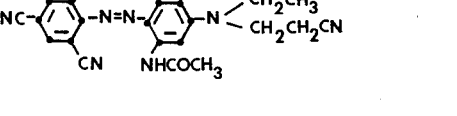 | blue |
| 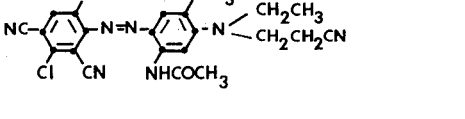 | dark blue |
| 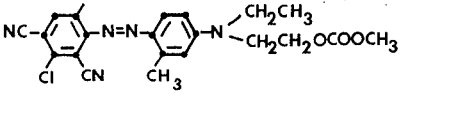 | reddish violet |

Table-continued
| Dyestuff | Shade on polyethylene terephthalate |
|---|---|
| 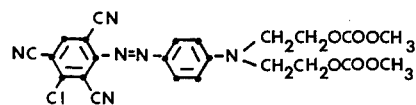 | bordeaux |
| 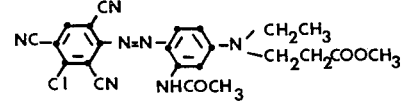 | reddish blue |
| 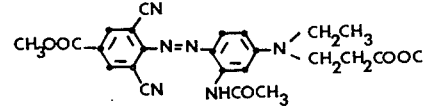 | reddish violett |
| 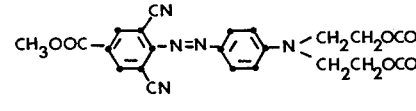 | bluish red |
| 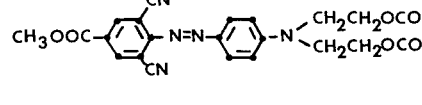 | bluish red |
| 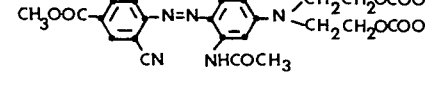 | red-violet |
| 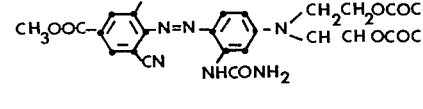 | red-violet |
| 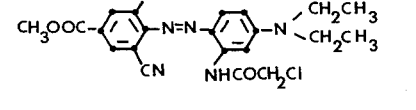 | violet |
| 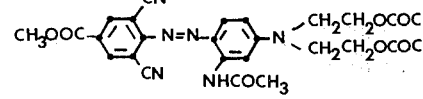 | reddish violet |

Table-continued

| Dyestuff | Shade on polyethylene terephthalate |
|---|---|
| [structure] | blue |
| [structure] | red |
| [structure] | ruby |
| [structure] | red |
| [structure] | bluish red |
| [structure] | red |
| [structure] | bluish red |
| [structure] | bluish red |
| [structure] | bluish red |
| [structure] | pink |

Table-continued
| Dyestuff | Shade on polyethylene terephthalate |
|---|---|
| 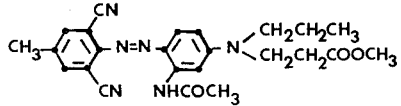 | bluish red |
| 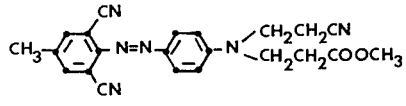 | yellowish orange |
| 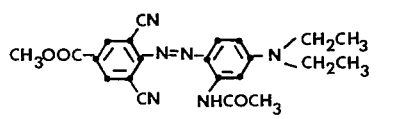 | violet |
| 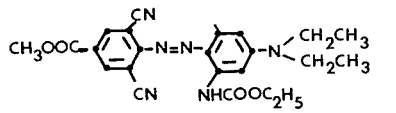 | reddish violet |
| 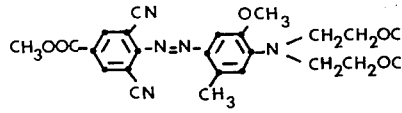 | red-violet |
| 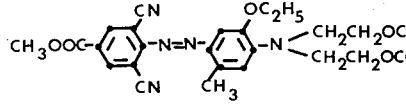 | red-violet |
| 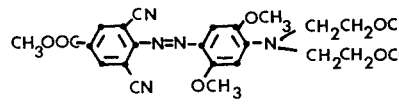 | red-violet |
| 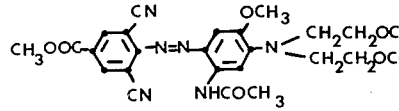 | blue |
| 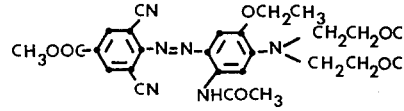 | blue |

EXAMPLE 11

0.5 Grams of the dyestuff of the formula

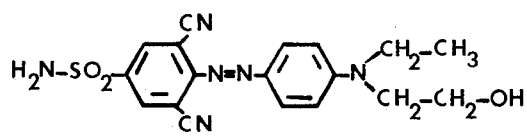

are introduced in well dispersed form at 40° – 50°C. into 1 liter of water which also contains 0.5 – 1 g. polyethylene glycol. 25 Grams of synthetic superpolyamide yarn are introduced into this bath, the temperature is raised to 95° – 100°C. within about 20 minutes and dyeing is carried out for about 1 hour. An intense Bordeaux dyeing of good fastness to wet processing and light is obtained.

The dyestuffs compiled in Table 2 dye synthetic superpolyamide fibres in the stated shades:

Table

| Dyestuff | Shade |
|---|---|
| | red-violet |
| | red-violet |
| | red |
| | red-violet |
| | red |
| | blue-violet |
| | blue |
| | red |
| | red |

Table-continued

| Dyestuff | Shade |
|---|---|
| 2,6-dicyanophenyl-azo-[3-methyl-4-(N-ethyl-N-(2-chloroethyl)amino)phenyl] | red |
| 2,6-dicyanophenyl-azo-[3-acetylamino-4-(N-ethyl-N-(2-methoxycarbonylethyl)amino)phenyl] | bordeaux |
| 2,6-dicyanophenyl-azo-[3-acetylamino-5-methyl-4-(2-hydroxyethylamino)phenyl] | ruby |
| 4-methoxy-2,6-dicyanophenyl-azo-[4-(N-butyl-N-(2-hydroxyethyl)amino)phenyl] | red-orange |
| 4-methoxy-2,6-dicyanophenyl-azo-[3-methyl-4-(N-butyl-N-(2-hydroxyethyl)amino)phenyl] | red |
| 4-methoxy-2,6-dicyanophenyl-azo-[3-methyl-4-(N-ethyl-N-(2-methoxycarbonylethyl)amino)phenyl] | scarlet |
| 4-methoxy-2,6-dicyanophenyl-azo-[3-methyl-4-(N-ethyl-N-(2-chloroethyl)amino)phenyl] | scarlet |
| 4-methoxy-2,6-dicyanophenyl-azo-[3-acetylamino-4-(N-ethyl-N-(2-methoxycarbonylethyl)amino)phenyl] | bordeaux |
| 4-methoxy-2,6-dicyanophenyl-azo-[3-acetylamino-5-methyl-4-(2-hydroxyethylamino)phenyl] | bordeaux |
| 4-methoxy-2,6-dicyanophenyl-azo-[3-acetylamino-4-(N-ethyl-N-(2-hydroxyethyl)amino)phenyl] | ruby |

*(Note: structural formulas shown as images in the original; descriptions above approximate the depicted structures.)*

Table-continued
| Dyestuff | Shade |
|---|---|
| 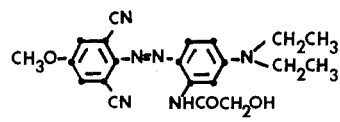 | ruby |
| 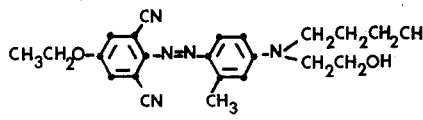 | red |
| 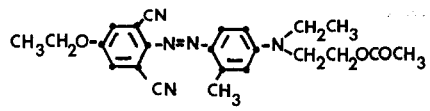 | scarlet |
| 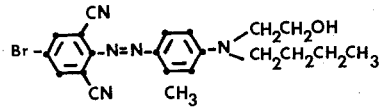 | bluish red |
| 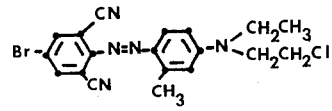 | bluish red |
| 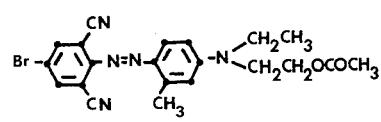 | bluish red |
| 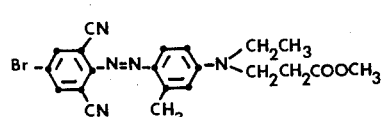 | bluish red |
| 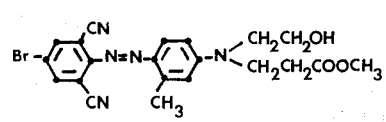 | bluish red |
| 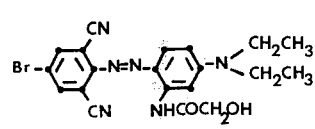 | red-violet |

Table-continued
| Dyestuff | Shade |
|---|---|
| 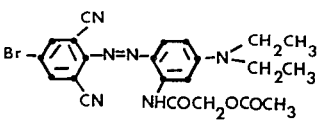 | red-violet |
| 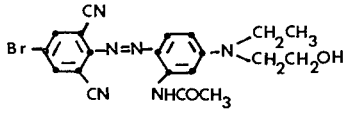 | red-violet |
| 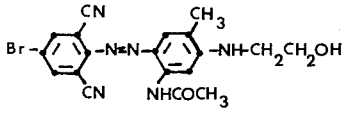 | red-violet |
| 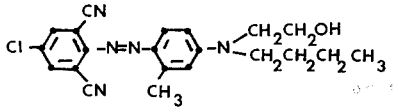 | bluish-red |
| 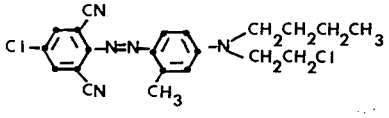 | bluish red |
| 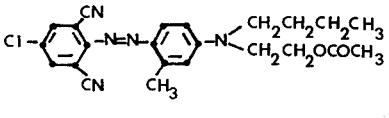 | bluish red |
| 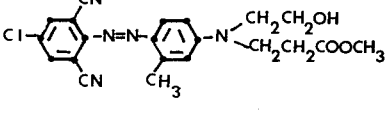 | bluish red |
| 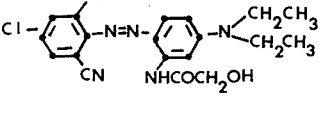 | red-violet |
| 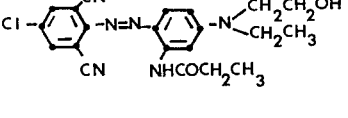 | red-violet |
| 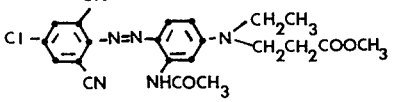 | red-violet |

Table-continued
| Dyestuff | Shade |
|---|---|
| 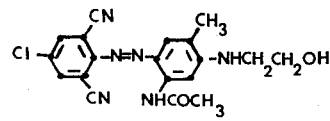 | red-violet |
| 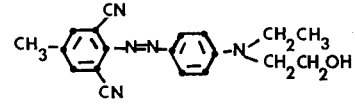 | scarlet |
| 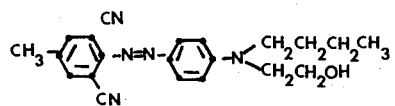 | yellowish red |
| 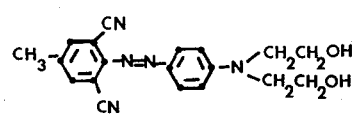 | yellowish red |
| 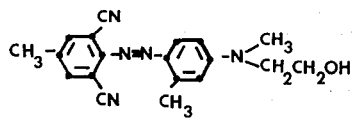 | red |
| 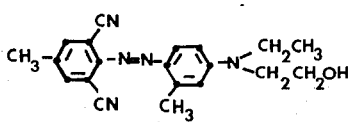 | red |
| 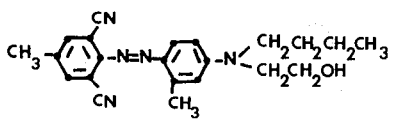 | bluish red |
| 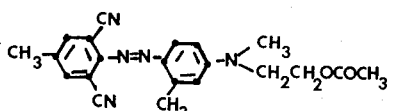 | yellowish red |
| 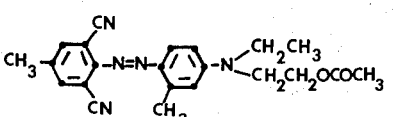 | yellowish red |
| 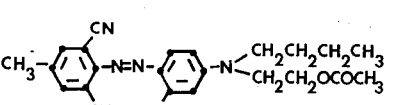 | red |

Table-continued
| Dyestuff | Shade |
|---|---|
| 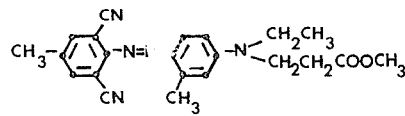 | red |
| 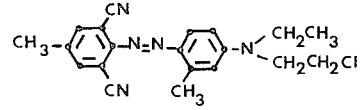 | yellowish red |
| 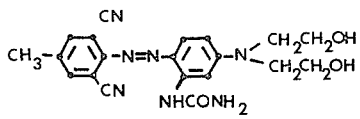 | bluish red |
| 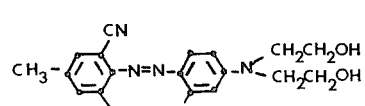 | bluish red |
| 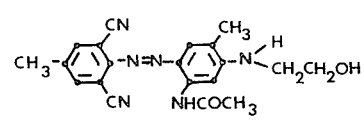 | bluish red |
| 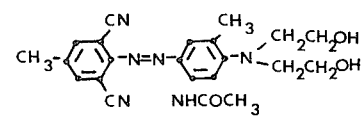 | bluish red |
| 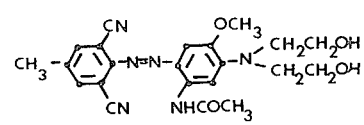 | reddish violet |
| 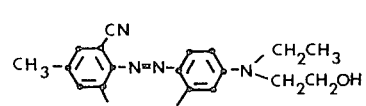 | bluish red |
| 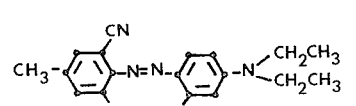 | bluish red |

Table-continued

| Dyestuff | Shade |
|---|---|
| CH₃-C₆H₂(CN)₂-N=N-C₆H₃(NHCOOC₂H₅)-N(CH₂CH₂OH)₂ | bluish red |
| CH₃-C₆H₂(CN)₂-N=N-C₆H₂(CH₃)(NHCOCH₂CH₃)-N(H)(CH₂CH₂OH) | bluish red |
| CH₃-C₆H₂(CN)₂-N=N-C₆H₃(NHCOCH₂CH₃)-N(CH₂CH₃)(CH₂CH₂OH) | bluish red |
| CH₃-C₆H₂(CN)₂-N=N-C₆H₃(NHCOCH₂CH₃)-N(CH₂CH₃)₂ | bluish red |
| CH₃-C₆H₂(CN)₂-N=N-C₆H₂(OCH₃)(CH₃)-N(CH₂CH₂OH)₂ | bluish red |
| CH₃-C₆H₂(CN)₂-N=N-C₆H₂(OC₂H₅)(CH₃)-N(CH₂CH₂OH)₂ | bluish red |
| CH₃-C₆H₂(CN)₂-N=N-C₆H₂(OCH₃)(OCH₃)-N(CH₂CH₂OH)₂ | bluish red |
| CF₃-C₆H₂(CN)₂-N=N-C₆H₃(NHCOCH₃)-N(CH₂CH₂OH)₂ | red-violet |
| CF₃-C₆H₂(CN)₂-N=N-C₆H₂(CH₃)(NHCOCH₃)-N(H)(CH₂CH₂OH) | red-violet |
| CF₃-C₆H₂(CN)₂-N=N-C₆H₂(CH₃)-N(CH₂CH₂CH₂CH₃)(CH₂CH₂OH) | bluish red |

Table-continued

| Dyestuff | Shade |
|---|---|
| CF₃–C₆H₂(CN)₂–N=N–C₆H₃(CH₃)–N(CH₂CH₃)(CH₂CH₂Cl) | bluish red |
| CF₃–C₆H₂(CN)₂–N=N–C₆H₃(CH₃)–N(CH₂CH₃)(CH₂CH₂OCOCH₃) | bluish red |
| CF₃–C₆H₂(CN)₂–N=N–C₆H₃(CH₃)–N(CH₂CH₃)(CH₂CH₂COOCH₃) | bluish red |
| CF₃–C₆H₂(CN)₂–N=N–C₆H₃(NHCOCH₂OCOCH₃)–N(CH₂CH₃)₂ | red-violet |
| CF₃–C₆H₂(CN)₂–N=N–C₆H₃(NHCOCH₃)–N(CH₂CH₃)₂ | red-violet |
| CF₃–C₆H₂(CN)₂–N=N–C₆H₃(NHCOCH₂OH)–N(CH₂CH₃)₂ | red-violet |
| CF₃–C₆H₂(CN)₂–N=N–C₆H₃(NHCOCH₂Cl)–N(CH₂CH₃)₂ | red-violet |
| CF₃–C₆H₂(CN)₂–N=N–C₆H₃(NHCOCH₃)–N(CH₂CH₃)(CH₂CH₂OH) | red-violet |
| HOCH₂CH₂O–C₆H₂(CN)₂–N=N–C₆H₃(CH₃)–N(CH₂CH₂CH₂CH₃)(CH₂CH₂Cl) | red |

Table-continued

| Dyestuff | Shade |
|---|---|
|  | red |
|  | red |
|  | red |

EXAMPLE 12

0.25 Grams of the dyestuff of the formula

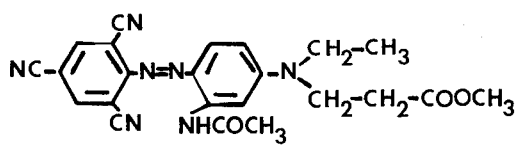

are introduced in dispersed form at 40° – 50°C. into 1 liter of water which contains 0.5 g. of a sulphite cellulose decomposition product and 1 g. cresotic acid methyl ester. 25 Grams of polyester yarn are introduced into this bath, the temperature is raised to 100°C. within 30 minutes and boiling is continued for about 60 – 90 minutes. A violet dyeing of good fastness to wet processing and light is obtained.

If the same dyestuff is applied under the stated conditions to synthetic superpolyamide yarn, then a violet dyeing of good fastness to wet processing and light is also obtained.

Further dyestuffs compiled in Table 3 yield in on analogous manner the stated shades on polyester and synthetic polyamide fibres.

Table

| Dyestuff | Shade on polyester + synth. polyamide | |
|---|---|---|
| 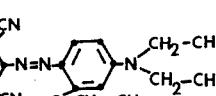 | violet | violet |
| 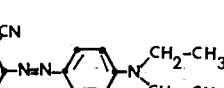 | violet | violet |
| 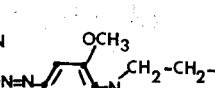 | greenish blue | greenish blue |
| 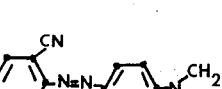 | red-violet | red-violet |

| Dyestuff | Shade on polyester | + synth. polyamide |
|---|---|---|
| (CH₃OOC–C₆H₂(CN)₂–N=N–C₆H₃(OCH₂CH₃)–N(CH₂CH₃)₂) | red-violet | red-violet |
| (Br–C₆H₂(CN)₂–N=N–C₆H₃(OC₂H₅)–N(CH₂CH₃)₂) | red | red |
| (NC–C₆H₂(CN)₂–N=N–C₆H₄–N(CH₂CH₂CN)(CH₂CH₂COOCH₃)) | red | red |
| (CH₃–C₆H₂(CN)₂–N=N–C₆H₃(NHCOCH₃)–N(CH₂CH₃)₂) | red | red |
| (C₆H₂(CN)₂–N=N–C₆H₃(OCH₂CH₃)–N(CH₂CH₃)₂) | red | red |
| (CH₃O–C₆H(CN)₂–N=N–C₆H₂(NHCOCH₃)–N(CH₂CH₃)₂) | red | red |
| (NC–C₆H₂(CN)₂–N=N–indole(C₆H₅)) | red | red |

EXAMPLE 13

1 Gram of the dyestuff of the formula

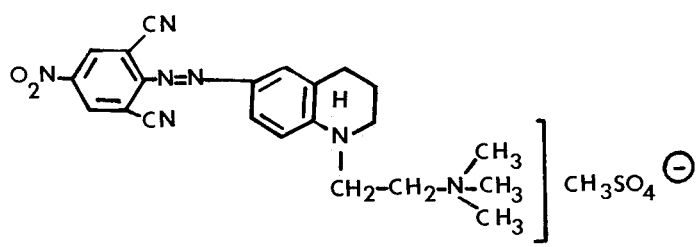

is dissolved in 3 liters of water with the addition of 3 ml. of 30% acetic acid. 100 Grams polyacrylonitrile fibre are introduced into this bath at 40° – 50°C., the temperature of the dyebath is raised to 100°C., within about 40 minutes and dyeing is carried out at this temperature for about 1 hour. A violet dyeing of good fastness to wet processing results.

Under the dyeing conditions of the present Example the dyestuffs mentioned in Table 4 yield the stated shades on polyacrylonitrile fibres:

Table

| Dyestuff | Shade on polyacrylonitrile |
|---|---|
| (structure) | red-violet |
| (structure) | violet |
| (structure) | yellowish red |
| (structure) | bluish red |
| (structure) | violet |
| (structure) | violet |
| (structure) | blue |
| (structure) | blue |
| (structure) | bordeaux |

Table-continued
| Dyestuff | Shade on polyacrylonitrile |
|---|---|
| 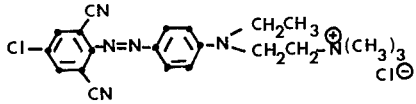 | yellowish red |
| 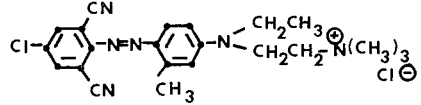 | red |
| 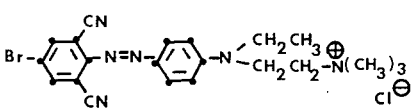 | yellowish red |
| 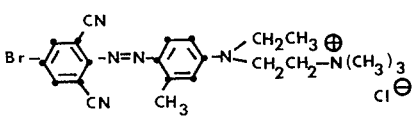 | red |
| 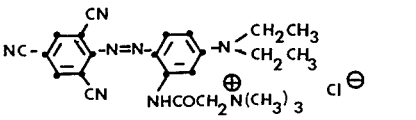 | violet |
| 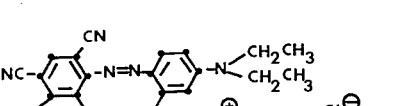 | violet |
| 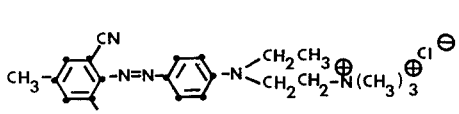 | scarlet |
| 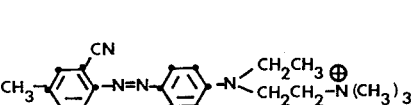 | yellowish red |
| 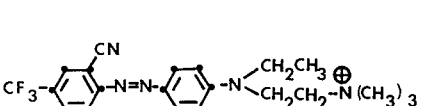 | yellowish red |

| Dyestuff | Shade on polyacrylonitrile |
|---|---|
| ![structure] CF₃–⟨CN,CN⟩–N=N–⟨CH₃⟩–N(CH₂CH₃)(CH₂CH₂–N⁺(CH₃)₃) Cl⁻ | red |
| ![structure] CF₃–⟨CN,CN⟩–N=N–⟨⟩–N(CH₂CH₃)(CH₂CH₂–N⁺pyridinium) Cl⁻ | yellowish red |
| ![structure] CF₃–⟨CN,CN⟩–N=N–⟨CH₃⟩–N(CH₂CH₃)(CH CH–N⁺pyridinium) Cl⁻ | red |
| ![structure] CF₃–⟨CN,NHCOCH₂N⁺(CH₃)₃⟩–N=N–⟨⟩–N(CH₂CH₃)₂ Cl⁻ | red-violet |

EXAMPLE 14

0,1 Gram of the dyestuff of the formula

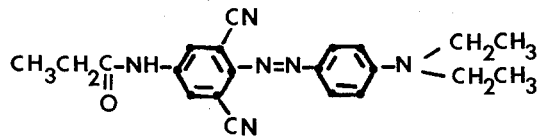

are introduced in well dispersed form at 40° – 50°C into 1 l of water which also contains 0,1 – 0,2 g polyethylene glycol. 10 g of synthetic superpolyamid yarn are introduced in this bath, the temperature is raised to 95° – 100°C within about 20 minutes and dyeing is carried out for about 1 hour. An intense clear red dyeing of good fastness to wet processing is obtained.

If in the present Example the substrate is replaced with 10 g. polyethyleneterephthalat yarn and dyed in presence of 0,1 – 0,2 g. 1-hydroxy-2-phenyl-benzene, then a clear red dyeing of good fastness is obtained.

Further dyestuffs compiled in the following table yield in an analogous manner the stated shades on polyester and synthetic superpolyamide fibres.

Table

| Dyestuff | Shade on synth. polyamide/polyester | |
|---|---|---|
| CH₃–C(O)–NH–⟨CN,CN⟩–N=N–⟨⟩–N(CH₂CH₃)₂ | red | red |
| CH₃–C(O)–NH–⟨CN,CN⟩–N=N–⟨⟩–N(CH₂CH₂CH₂CH₃)(CH₂CH₂OH) | red | red |

Table-continued

| Dyestuff | Shade on synth. polyamide/polyester | |
|---|---|---|
| HO-CH₂-C(=O)-NH-[2,6-diCN-phenyl]-N=N-[4-N(CH₂CH₃)₂-phenyl] | red | red |
| Cl-CH₂CH₂-C(=O)-NH-[2,6-diCN-phenyl]-N=N-[3-CH₃-4-N(CH₂CH₂CH₂CH₃)(CH₂CH₂OH)-phenyl] | pink | bluish red |
| H₂N-C(=O)-NH-[2,6-diCN-phenyl]-N=N-[4-N(CH₂CH₃)₂-phenyl] | red | red |
| CH₃O-C(=O)-NH-[2,6-diCN-phenyl]-N=N-[4-N(CH₂CH₂CH₂CH₃)(CH₂CH₂OC(=O)CH₃)-phenyl] | red | red |
| CH₃-C(=O)-N(CH₂CH₃)-[2,6-diCN-phenyl]-N=N-[3-CH₃-4-N(CH₂CH₃)(CH₂CH₂Cl)-phenyl] | pink | bluish red |
| (succinimido)-[2,6-diCN-phenyl]-N=N-[3-NHCOCH₃-4-N(CH₂CH₃)(CH₂CH₂COOCH₃)-phenyl] | ruby | bluish red |
| C₆H₅-C(=O)-NH-[2,6-diCN-phenyl]-N=N-[4-N(CH₂CH₃)(CH₂CH₂OH)-phenyl] | red | red |
| C₆H₅-SO₂-N(CH₃)-[2,6-diCN-phenyl]-N=N-[3-NHCOCH₃-4-N(CH₂CH₃)(CH₂CH₂OH)-phenyl] | ruby | bluish red |

Table-continued

| Dyestuff | Shade on synth. polyamide/polyester | |
|---|---|---|
| 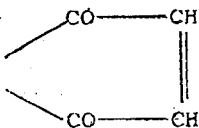 | ruby | bluish red |

We claim:

1. Process for the production of azo dyestuffs containing at least one cyano group in the diazo component ortho to the azo group, which comprises reacting at a temperature from about room temperature to less than 100°C an azo dyestuff of the formula X—A—N=N—K wherein A stands for an aromatic carbocyclic radical linked to the azo group by a nuclear carbon atom, X stands for Cl or Br linked by a nuclear carbon atom to A in the ortho position to the azo group, and K stands for the radical of a coupling component linked by a nuclear carbon atom to the azo group, with a metal cyanide in a polar aprotic organic solvent with the exchange of the substituent X for cyano wherein the metal cyanide is copper (I) cyanide or copper (I) cyanide formed in situ by the reaction of alkali metal cyanide with a suitable copper (II) salt.

2. Process of claim 1 wherein A is a radical of the formula

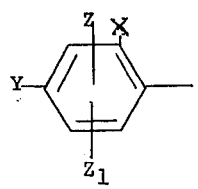

Y is $NO_2$, CN, $CF_3$, $R_1$, $OR_1$, $SO_2R_1$,

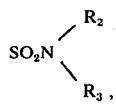

F, Cl, Br, $COR_4$, or

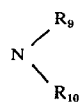

$R_1$ is $CH_3$, $C_2H_5$, or phenyl
$R_1$ is $CH_3$, $C_2H_5$, $C_2H_4OH$, $C_2H_4OCOCH_3$, $C_2H_4OCH_3$ or $CH_2 COOCH_3$
$R_2$ and $R_3$ are H or $CH_3$
$R_4$ is H, OH, $R_1$, $OR_1$, or

$R_9$ is selected from the group consisting of formyl, substituted or unsubstituted alkyl carbonyl with 1–4 carbons in the alkyl group wherein the substituents are selected from the group consisting of OH, Cl, CN, $NH_2$, $OCOCH_3$ and $OCOC_2H_5$; phenyl carbonyl, wherein the phenyl radical is unsubstituted or substituted with a member selected from the group consisting of $CH_3$, Cl, $NO_2$ and $OCH_3$; benzyl carbonyl; methyl sulfonyl; phenyl sulfonyl, tolyl sulfonyl, amino carbonyl which is unsubstituted or contains N-substituents selected from the group consisting of $CH_3$ and $C_2H_5$; alkoxy carbonyl wherein the alkyl member contains 1 to 2 atoms; benzyloxy carbonyl; phenylsulfonyl; methylsulfonyl and phenyloxycarbonyl; wherein $R_{10}$ is selected from the group consisting of alkyl with 1–4 carbon atoms, H, and cyclohexyl; and wherein $R_9$ and $R_{10}$ may together be selected from the group of divalent cyclic radicals consisting of

and

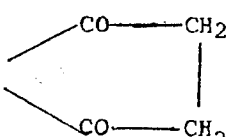

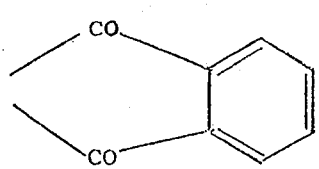

and wherein Z and $Z_1$ stands for H or a member of the group CN, $NO_2$, $CF_3$, $OR'_1$, $SO_2R_1$,

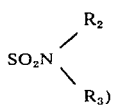

F, Cl, Br, $COR_4$ or $R_1$.

3. Process of claim 2 wherein the azo dyestuff reactant has the formula:

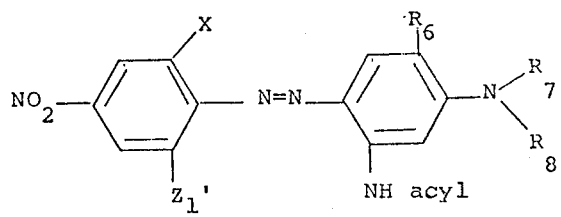

wherein
$Z_1$ is H, CN, $NO_2$, Cl, Br, $SO_2CH_3$ or $SO_2C_2H_5$;
$R_6$ is H, $OCH_3$ or $OC_2H_5$
$R_7$ and $R_8$ are alkyl or $C_{1-4}$ alkyl with a substituent of the class OH, CN, $OCH_3$, Cl, $COOCH_3$, $COOC_2H_5$, $OCOCH_3$, $OCOOCH_3$, and $OC_2H_4OH$;

Acyl is $CO-R_{12}$ where $R_{12}$ is $NH_2$, $OCH_3$, $OC_2H_5$, $CH_3$, $C_2H_5$, $CH_2OH$, $CH_2Cl$, $C_2H_4Cl$, or $CH_2O-COCH_3$ 4. Process of claim 3 wherein $Z_1$ is CN.

5. Process of claim 2 wherein the azo dyestuff reactant has the formula

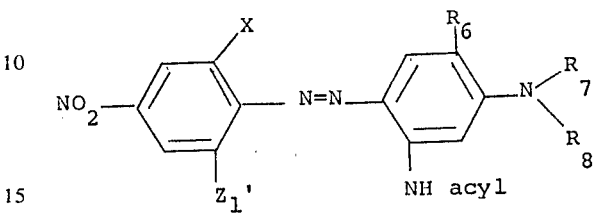

where
$Z_1'$ is H, CN, $NO_2$, Cl, or Br,
$R_6$ is H, $OCH_3$ or $OC_2H_5$,
$R_7$ and $R_8$ are $C_{1-4}$ alkyl or $C_{1-4}$ alkyl with a substituent of the class OH, CN, $COOCH_3$, $OCOCH_3$, $OCOOCH_3$ or $OC_2H_4OH$,
Acyl is $COR_{12}$ where $R_{12}$ is $CH_3$, $CH_2OH$, $CH_2O-COCH_3$, $CH_2-CL$, $C_2H_4Cl$ or $OCH_3$.

6. The process of claim 1 wherein the reaction occurs at from 25°C to 150°C.

7. The process of claim 1 wherein the reaction occurs below 100°C.

8. The process of claim 3 wherein $Z'_1$ is CN, $NO_2$, Cl, Br, $SO_2CH_3$ or $SO_2C_2H_5$.

9. The process of claim 5 wherein $Z'$ is CN, $NO_2$, Cl, or Br.

* * * * *